US000001830H

United States Statutory Invention Registration [19]

[11] Reg. Number: H1,830

Petrimoulx et al.

[45] Published: Jan. 4, 2000

[54] SYSTEM FOR USE-TAX DETERMINATION

[75] Inventors: Rosalyn A. Petrimoulx, Hope; Tamara Marie Wellington, Freeland, both of Mich.; Nancy Lou Huey Kanter, Brazoria; Maria Dalia Montague, Lake Jackson, both of Tex.; David Joseph Burgie; Patrick A. Carey, both of Midland, Mich.

[73] Assignee: The Dow Chemical Company, Midland, Mich.

[21] Appl. No.: 08/877,785

[22] Filed: Jun. 17, 1997

[51] Int. Cl.[7] ..... G06F 17/60

[52] U.S. Cl. ..... 705/31; 705/30; 705/34

[58] Field of Search ..... 705/31, 30, 34

[56] References Cited

U.S. PATENT DOCUMENTS

| | | | |
|---|---|---|---|
| 4,623,964 | 11/1986 | Getz et al. | 364/401 |
| 5,136,502 | 8/1992 | Van Remortel et al. | 364/413.01 |
| 5,335,169 | 8/1994 | Chong | 364/408 |

(List continued on next page.)

OTHER PUBLICATIONS

Mark A. Luscombe, "Taxation of knowledge," *Taxes*, vol. 74, No. 3, Mar. 1996, pp. 183–185.

Stuart Kahan, "A practical guide to fixed assets software," *The Practical Accountant*, vol. 29, No. 2, Feb. 1996, pp. 40–46.

Robert W. Scott, "Business tax vendors race to broaden user options," *Accounting Today*, vol. 9, No. 21, Nov. 20–Dec. 10, 1995, pp. 26, 30–33.

Robert W. Scott, "Windows 95 colors 1996 tax software season," *Accounting Today*, vol. 9 No. 19, Oct. 23–Nov. 5, 1995, pp. 26, 31, 44–47.

Michael T. Smith, et al., "Two temporary solutions: Purchasing cards trip over tax reporting," *Corporate Cashflow*, vol. 16, No. 9, Sep. 1995, pp. 21–22.

Sam W. Stearman, "Spotlight on tax software," *Journal of Accountancy*, vol. 178, No. 4, Oct. 1994, pp. 49–74.

Nathan J. Muller, "Multicurrency accounting software arrives!" *Accounting Technology*, vol. 9, No. 10, Dec. 1993, pp. 47–50, 52,54.

(List continued on next page.)

*Primary Examiner*—Daniel T. Pihulic

*Attorney, Agent, or Firm*—Dale H. Shultz; William B. Miller; Stephen S. Grace

[57] ABSTRACT

This invention relates to computer-implemented tax preparation and tax submission accounting, and the invention is directed to providing a system which enables use-tax accrual and determination. The described computer system has transaction record acquisition logic for acquiring transaction information characterizing purchases of goods and services and for generating transaction records; use-tax accrual logic; and tax rate acquisition logic for acquiring tax jurisdiction codes, at least one inclusive accounting group registry respective to taxes, and tax information respective to the tax jurisdiction codes from an external tax information source. The invention also provides data alignment logic used to assure that data elements used in tax determination are interactively harmonious and mutually comprehensive. The invention also provides (1) update logic for periodically acquiring new tax information from a tax rate database to keep tax rate information in a current and relevant condition and (2) sales tax crediting logic in the computer so that paid sales taxes can be credited to accrued use-taxes.

36 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | |
|---|---|---|---|
| 5,644,724 | 7/1997 | Cretzler | 705/19 |
| 5,799,283 | 8/1998 | Francisco et al. | 705/19 |
| 5,819,249 | 10/1998 | Dohanich et al. | 706/46 |

OTHER PUBLICATIONS

Edwin Brooks Niemeyer, "Taking Advantage of the Taxman," *New England Business*, vol. 12, No. 10, Oct. 1990, pp. 96–97.

Dialog File 148 (IAC Trade & Industry Database), No. 08499275, "Taxware Partners with Open Market to Provide Secure Tax Systems for Electronic Commerce", PR Newswire, 2 pages, Mar. 4, 1996.

Taxware Partners with Open Market to Provide Secure Tax Systems for Electronic Commerce (PR Newswire, Dialog File 148 (IAC Trade & Industry Database), Document No. 08499275), Mar. 4, 1996.

START
READ NEW COST CENTER TRANSACTION RECORD
RELEVANT COST CENTER?
NO
YES
EXTRACT COST ELEMENT
RELEVANT COST ELEMENT?
NO
YES
DEFINE TAXABLE PERCENTAGE
EXTRACT POSTAL DELIVERY CODE
DEFINE TAX RATES
CALCULATE AND STORE AMOUNT OF TAX IN OUTPUT FILE
LAST COST CENTER TRANSACTION RECORD?
NO
YES
INITIATE ORDER TYPE PORTION

INITIATE ORDER TYPE PORTION
READ NEW ORDER TYPE TRANSACTION RECORD
LAST ORDER TYPE TRANSACTION RECORD?
NO
YES
END
RELEVANT ORDER TYPE?
NO
YES
EXTRACT COST ELEMENT
RELEVANT COST ELEMENT?
NO
YES
DEFINE TAXABLE PERCENTAGE
EXTRACT POSTAL DELIVERY CODE
DEFINE TAX RATES
CALCULATE AND STORE AMOUNT OF TAX IN OUTPUT FILE

SYSTEM FOR USE-TAX DETERMINATION

FIELD OF THE INVENTION

This invention relates to computer-implemented tax preparation and tax submission accounting. Specifically, this invention is directed to providing a system which enables use-tax accrual and determination.

BACKGROUND OF THE INVENTION

Sales taxes and use-taxes need to be defined and paid by business enterprises in the course of their operations. In a nation such as the United States of America, proper and efficient fulfillment of this requirement by a business enterprise executing multiple-location operations requires substantial expenditure of effort, resources, and time as a plurality of tax situations respective to different jurisdictional entities such as states, counties, cities, towns, and townships compel ongoing attention. Furthermore, many of these different jurisdictional entities have effective tax rates respective to the purpose for which items and services are acquired; in this regard, jurisdictions extend certain implicit "use-tax" incentives to influence and encourage certain types of activities (e.g. investment in projects which enhance environmental quality, expansion of the business enterprise base of the jurisdiction by encouraging industrial processing within that jurisdiction, and cooperative support with the jurisdiction of socially beneficial initiatives). Additionally, effective tax rates respective to these "use-taxes" can, at times, be different respective to certain goods and services since the jurisdiction may either define the rates only for a certain limited time, or, in the normal course of rate setting, change the rate. A further complication in tax management is that payment of sales tax in some jurisdictions must take place at the time of sale and must be collected by the seller, whereas, in other jurisdictions, the payment of sales tax may be accrued in an account by the purchaser for a period of time and then paid as a part of a single payment "use-tax". An additional complication in tax management occurs when an article is purchased in one jurisdiction and then transported into another jurisdiction for use (or when the cumulative value of a set of such articles purchased with a defined period of time and so transported exceeds a certain value threshold). These complexities have prompted developments in tools and methods which assist in maintaining up-to-date information and in computing taxes. One example of a product offered in this regard is CLR/ Fast-Tax (CLR Fast-Tax Corporation of Carrollton, Texas), a product having both a file showing current tax rate information and a computer-implemented program for determining a proper allocation of taxes to different relevant jurisdictions respective to a location (e.g. a business enterprise in an urban location usually must interact with a city jurisdictional entity, a county jurisdictional entity, and a state jurisdictional entity, as well as with the federal jurisdictional entity since each of the city, county, and state entities has authority respective to that location). Another system for handling taxes is described in U.S. Pat. No. 5,335,169 issued on Aug. 2, 1994 to Malcolm K. L. Chong entitled "System for Tracking Multiple Rate Assessments On Transactions" for tracking and reporting taxable, non-taxable, and tax exempt sales transactions which are subject to a number of taxing jurisdictions for companies selling goods; it should be noted, however, that the patent to Chong seems to be specific to the needs of a selling party and does not fully deal with needs of purchasing parties. In this regard, sales taxes (the interest of the selling party in a transaction) and use-taxes (the interest of the purchasing party in a transaction) are different (although, in many situations, they appear to result in the same amount of tax being paid), so companies purchasing and using goods need a system which is directed to handling use-tax issues and detail. What is needed, therefore, is a system and a method providing use-tax preparation and submission accounting; the present invention provides such a system and method.

OBJECT OF THE INVENTION

It is a principle object of the present invention to provide a machine for use-tax determination.

It is a further object of the present invention to provide a machine for use-tax determination which is based upon a generally available computer having commercially available operating system logic and special logic specific to use-tax determination.

It is yet a further object of the present invention to provide a machine for use-tax determination which has: (A) transaction record acquisition logic for (1) acquiring transaction information characterizing purchases of goods and services and (2) generating transaction records; (B) use-tax accrual logic; and (C) tax rate acquisition logic for (1) acquiring tax jurisdiction codes, at least one inclusive accounting group registry respective to taxes, and tax information respective to the tax jurisdiction codes for a plurality of state jurisdictions, and (2) generating a data schema with data elements descriptive of the inclusive accounting group registries, tax jurisdiction codes, and tax information.

It is yet a further object of the present invention to provide a machine for use-tax determination having data alignment logic used to assure that the data elements indicated above are interactively harmonious and mutually comprehensive.

It is yet a further object of the present invention to provide a machine for use-tax determination having special logic which reads primary transaction records and builds derived simplified transaction records to help manage optimum access to the computing environment.

It is yet a further object of the present invention to provide a machine for use-tax determination which has tax rate update logic for periodically acquiring new tax information from a tax rate database to keep tax rate information current and relevant.

It is an additional object of the present invention to provide a machine for use-tax determination which has sales tax crediting logic in the computer so that paid sales taxes can be deducted from accrued use-taxes.

As a process and method, it is an object of the present invention to provide a method for use-tax determination using a generally available computer having (1) commercially available operating system logic and (2) special logic for use-tax determination.

It is a further object of the present invention to provide a computer-implemented method for use-tax determination which aligns the data elements used in the use-tax determination so that they are interactively harmonious and mutually comprehensive.

It is a yet a further object of the present invention to provide a computer-implemented method for use-tax determination which builds simplified transaction records respective to the transaction records in the computer and determines the accrued use-taxes in the computer from the simplified transaction records to help manage optimum access to the computing environment in a business enterprise.

It is yet a further object of the present invention to provide a computer-implemented method for use-tax determination which credits paid sales taxes to accrued use-taxes.

GLOSSARY OF TERMS

A glossary is herewith presented to help clarify some key terms used in discussing the present invention.

Cost Object: A cost object is a datalogical accounting entity which functions as a logical identifier for an accounting domain and can also be virtually used to reference the accounting domain with which it is affiliated. In this regard, a cost object has a relationship to an accounting domain which is similar to the relationship of a person to the name (or a portion of the name) by which they are identified. A cost object or combination of cost objects assist accounting personnel in defining a meaningful and useful detailed purpose for a transaction or set of transactions. The set of cost objects used in an accounting system ultimately must enable account specificity which is of sufficient detail to enable achievement of all reporting obligations and needs in the business enterprise.

Order Type: An Order Type is an accounting cost object which is referenced in conjunction with an account used to collect costs for "short term items" or for accounting entities useful to a business enterprise which have two key attributes of (a) an initiating moment of time and (b) an (at least presumed) ending moment of time. Examples of Order Types are (1) an addition to a building or remodeling of a plant used to make a product; (2) a set of costs connected to a batch (also known as a lot) of manufactured material which has a set of attributes (e.g. test results or records relating to manufacturing conditions) helping to distinguish it as a separate entity for record-keeping purposes; (3) a set of costs connected to a batch (also known as a lot) of acquired material which has a set of attributes (test results) helping to distinguish it as its own entity for record-keeping purposes; or (4) a set of costs made to a particular outside business enterprise entity for services rendered over a period of time.

Project: A Project or Project Account is an Order Type accounting cost object which is frequently distinguished from other Order Types because it is affiliated with a defined amount of capital which can be depreciated in the tax reports of a business enterprise.

Cost Center: A Cost Center is an accounting cost object which references an ongoing account used to collect costs for accounting entities useful to a business enterprise which does not have an (at least presumed) ending moment of time as an attribute. Cost Centers tend to reflect the standing, ongoing, and established accounting groupings (and their internally affiliated equipment, personnel, purchases, sales, and the like) which characterize the business enterprise. Although Cost Centers do indeed have an "end point" in verity, the definition of when that end point will occur is not usually identified; Cost Centers, therefore, do not necessarily have an "end point" in theory. A Cost Center is distinguished from an Order Type by a presumption and intent on the part of personnel in the business enterprise respecting permanence; since this presumption and intent has implications for tax and securities reporting and, thereby, for auditing, it is useful for the different types of accounts to be supported in a computer system such as that related to the present invention.

Cost Element: A Cost Element is an accounting cost object which is an identifier used to categorize a type of spending. Examples of Cost Elements are salaries, materials and supplies, raw materials, labor and services, payments to a utility company, and the like. Cost Elements are used to distinguish what type of needed item or service a business enterprise has acquired or the purpose for which the business enterprise may have acquired the particular item or service; since the type of item or service or purpose for acquisition has implications for tax and securities reporting and, thereby, for auditing, it is useful for the different identifiers to be supported in a computer system such as that related to the present invention. An example, in this regard, of an item acquired for a distinct purpose respective to taxes would be of a pump used for an environmental purpose; since certain tax jurisdictions encourage the expenditure of resources toward the enhancement of the environment through the granting of a tax benefit for money spent toward that purpose, a Cost Element is attached to this particular expenditure by the accounting system to help in designating its special tax status.

Accounting group registry: A fundamental accounting cost object which uniquely distinguishes the tax, accounting, and business enterprise relevance of money related to a particular transaction or other event for purposes of reporting, accounting, and archival. Order Types (and Projects or Project Accounts), Cost Centers, and Cost Elements are all general accounting cost objects which are useful in building efficient data schema within large business enterprises; but a particular transaction is usually reported-for, accounted-for, and archived using a combination of these general accounting cost objects; the combinatorial result is an accounting group registry for the transaction or summary of transactions having the same combination of identifying cost objects. As an example, in some business enterprises, the Cost Element is appended as a "suffix" to a particular Cost Center in reporting, accounting, and archiving a particular transaction or summary of transactions; so the combination of a particular Cost Center and its Cost Element suffix define the relevant accounting group registry. As another example, the Cost Element is appended as a prefix to Project Account (an "Order Type") in reporting, accounting, and archiving a particular transaction or summary of transactions, so the combination of the particular Project Account and its Cost Element prefix define the accounting group registry. In a very small business enterprise, it may indeed be practical to give a non-combinatorial unique accounting location (accounting group registry with an affiliated unique logical identifier reference) to each transaction, but, as an example in a large business enterprise, the existence of 1000 Cost Centers and 1000 Cost Elements would define at least 1,000,000 (1000 times 1000) general accounting cost objects if such unique identifiers were used. In practice therefore, a necessary accounting group registry is usually achieved via a combination of cost object datalogical types, since it costs much less to maintain 2000 cost objects (e.g. 1000 Cost Centers and Object Types +1000 Cost Elements) instead of the comparable 1,000,000 accounting group registry cost objects which would be required if the accounting system in a business enterprise could not support the combination of identifiers in its accounting system. The present invention will be described in detail using the general accounting cost objects which help to most efficiently achieve the system described; however, the invention also relates to the fundamental accounting group registry verity which is essentially defined by the combination of the relevant cost objects related to each described transaction.

Tax rate data element: An item of data which is used in the determination of taxes.

Tax Rate: A type of tax rate data element which defines a percentage or an otherwise relative amount which is applied to the value of a transaction to define a jurisdiction's tax.

Taxable Percentage: A type of tax rate data element which defines the proportion of a transaction which is subject to a Tax Rate. A taxable percentage can be useful in the operation of a jurisdiction insofar as an "incentive" can be created by defining a taxable percentage respective to established tax rates without changing the tax rate (per se) to achieve the incentive. In this manner, the incentive can be defined to a proper sophistication without burdening the tax rate definition per se with complexities respective to the incentive.

SUMMARY OF THE INVENTION

To achieve the foregoing objectives, the present invention provides an apparatus for determining accrued use-taxes, the apparatus having a computer; transaction record acquisition logic in the computer for acquiring transaction information characterizing purchases of goods and services and, then, for generating transaction records; use-tax accrual logic in the computer linked to the transaction records; and tax rate acquisition logic in the computer for (firstly) acquiring tax jurisdiction codes, at least one inclusive accounting group registry respective to taxes, and tax information respective to the tax jurisdiction codes for a plurality of state jurisdictions, and (secondly) for generating a data schema linked to the use-tax accrual logic having first data elements descriptive of inclusive accounting group registries, second data elements descriptive of tax jurisdiction codes, and third data elements descriptive of tax data respective to the tax jurisdiction codes.

The present invention also provides an apparatus such as that described above where the tax rate acquisition logic further acquires data descriptive of excluded accounting group registries and the data schema further comprises fourth data elements descriptive of excluded accounting group registries.

The present invention also provides an apparatus such as that described above where the tax rate acquisition logic further has the first, second, third, and fourth data elements arranged in tables in the data schema.

The present invention also provides an apparatus such as that described above where the tax rate acquisition logic further has data alignment logic in the computer which is used to assure that the cost objects and other data elements described above are interactively harmonious and mutually comprehensive.

The present invention also provides an apparatus such as that described above where the tax rate acquisition logic further has transaction record extraction logic in the computer used to read the transaction records and to build simplified transaction records respective to the transaction records.

The present invention also provides an apparatus such as that described above where the tax rate acquisition logic further has tax rate update logic in the computer linked to the data schema and to the tax rate database for periodically acquiring new tax information from the tax rate database to replace respective third data elements.

The present invention also provides an apparatus such as that described above where the tax rate acquisition logic further has sales tax crediting logic in the computer linked to the sales tax payment record and to the data schema such that the paid sales taxes can be credited to the accrued use-taxes.

The present invention also provides a method for determining accrued use-taxes from transaction records holding data elements which characterize purchases of goods and services which has the steps of providing a computer; acquiring transaction information characterizing purchases of goods and services; generating transaction records in the computer from the transaction information; acquiring tax jurisdiction codes, at least one inclusive accounting group registry respective to taxes, and tax information respective to the tax jurisdiction codes from at least one external tax information source having that information and data for a plurality of state jurisdictions; generating (in the computer) a data schema having first data elements descriptive of the inclusive accounting group registries, second data elements descriptive of the tax jurisdiction codes, and third data elements descriptive of the tax information respective to the tax jurisdiction codes; and accessing (in the computer) the data schema to acquire the first, second, and third data elements; accessing in the computer the transaction records to acquire the data elements which characterize purchases of goods and services; and using the data elements which characterize purchases of goods and services and using the first, second, and third data elements to determine the accrued use-taxes in the computer.

The present invention also provides a method such as that described above having the steps of (1) acquiring data elements descriptive of Order Type, excluded accounting group registries, and excluded cost objects; and (2) generating, in the data schema in the computer, fourth data elements descriptive of excluded accounting group registries.

The present invention also provides a method such as that described above having the step of aligning the data elements so that they are interactively harmonious and mutually comprehensive.

The present invention also provides a method such as that described above having the steps of building simplified transaction records respective to the transaction records in the computer and determining the accrued use-taxes from the simplified transaction records.

The present invention also provides a method such as that described above having the steps of periodically acquiring new tax information from the tax rate database to replace respective third data elements.

The present invention also provides a method such as that described above having the step of crediting the paid sales taxes to the accrued use-taxes.

Finally, the present invention provides computer-implemented logic and a method for generating an amended tax report enabling corrections to be filed to harmonize previously-filed tax reports respective to the findings of an auditor or other entity reviewing the filed tax reports for the business enterprise.

DETAILED DESCRIPTION OF THE INVENTION

Figure 1:
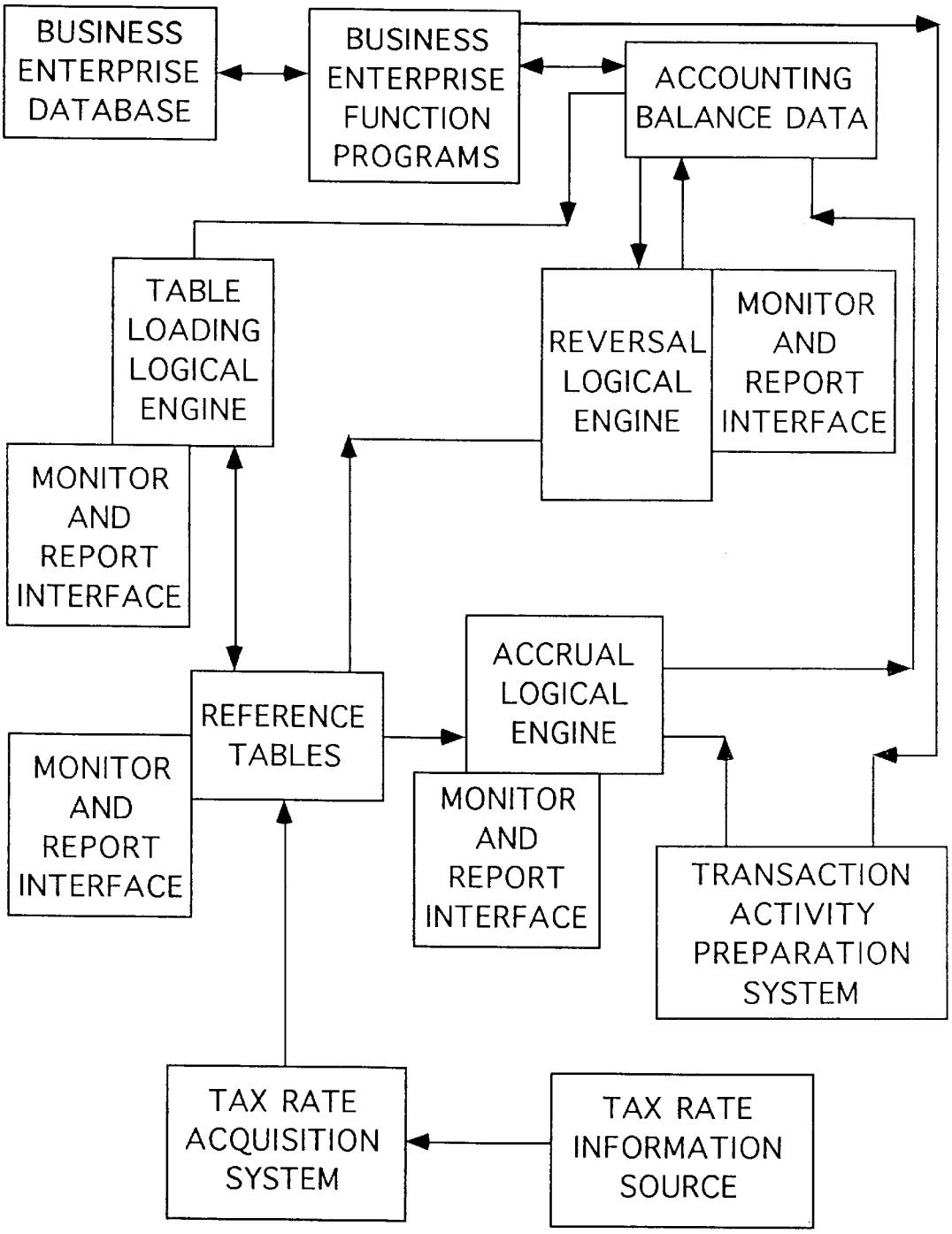
FIG. 1 presents the tax accrual system overview of the present invention.

The present invention is enabled through use of a machine which is a special purpose computer created by combining a general purpose computer with computer program code directed to the particular function of accrued use-tax determination. Details related to the description of a general purpose computer are discussed with respect to FIG. 8. The computer program code (resident within the computer) directed to the particular function of accrued use-tax determination provides at least one "component part" of the machine. The computer program code may be in the form of, without limitation, inter-linked modules, routines and subroutines, program objects, and/or installed interactive processes. In some emergent computer designs, enabled by modern application specific integrated circuitry (ASIC) technology, computer program code may be at least partially expressed in hardwired circuitry reminiscent of traditional hardwired gate arrangements which execute simplified logical scenarios without need for computers capable of executing sequential instructions in conjunction with a clock pulse. It is useful to reference the computer program code collectively in execution with the general purpose computer as "logic", with the logic being further subdivided to include logical engines, logical data schema, and logical linkages. In this regard, logical engines reference descriptively useful virtual functional elements within the logic which read data, write data, calculate data, and perform decision operations related to data; and logical data schema reference descriptively useful virtual functional elements within the logic which store and hold data in a systematic and methodical manner for convenient access in electronic or other form. A logical data schema is, therefore, a collection, assembly, and compilation of data in a methodical way for use in the computer. Logical linkages function to define descriptively useful virtual functional data pipelines between logical engines and logical data schema; in this regard, a logical linkage facilitates data communication (communication in a datalogical context) between other logical entities. A link or connection in computer processing, therefore, usually has both a physical attachment and a logical linkage dimension which enables information to be meaningfully exchanged across the physical attachment. A logical engine executes a useful process (useful data work) on data, a logical data schema holds data in a usefully organized way in an appropriately elegant structural arrangement, and a logical linkage provides an acceptably secure and robust communication path between different logical engines and/or logical data schema for the transfer of data between any two of those logical entities. As a comparative metaphor, a first logical data schema linked to a first logical engine which outputs via a second linkage to a second logical data schema can be paralleled to a first tank which has a pipeline to a pump which outputs via a second pipeline to a second tank. The "tank to pipeline to pump to second pipeline to second tank" arrangement executes to transfer a liquid such as water even as the "first logical data schema linked to a first logical engine which outputs via a second linkage to a second logical data schema" arrangement executes to transfer data. In respect to the foregoing, it is important to recognize that a reference to logical engines, logical linkages, and/or logical data schema presumes and incorporates the apparent physical means enabling the logical dimension to be achieved; the reference and focus on the logic helps in distinguishing the aspects of the special purpose computer which is the subject of the present invention from a general purpose computer or other type of special purpose computer.

The Figures of this detailed description will define structural relationships between key modules and components within the computer program code and other aspects of the invention which enable the functionality of the machine of the present invention to be realized; in this regard, the machine ultimately is constructed out of a combination of hardware and software.

FIG. 1 presents Tax Accrual System Logic Overview 101. Business Enterprise Database 103 is a general data schema holding individual entries (records of events including orders, sales, acquisitions, receipts, purchases, inventory changes, and the like) in the ongoing process of a business enterprises entities' activities. Business Enterprise Database 103 receives data from Business Enterprise Function Programs 105 and may also be a source of data for other programs (computer executed logical processes relating to orders, sales, acquisitions, receipts, purchases, inventory changes, and the like used in the general operations executed to read, calculate or reorganize, and write data) which are used in the ongoing process of a business enterprise's activities. Some programs in Business Enterprise Function Programs 105 function to transfer certain records in Business Enterprise Database 103 into accounting entries which have relevance in the characterization of operations respective to cost control, corporate performance reporting, and tax return preparation; these programs may also define accounting entries without a need for reference to Business Enterprise Database 103. The output from the programs in Business Enterprise Function Programs 105 functioning to define accounting entries is, however, stored in a database type of data schema defined herein as Accounting Balance Data 107. The general relationships between Business Enterprise Database 103, Business Enterprise Function Programs 105, and Accounting Balance Data 107 are very common in most business enterprises which have evolved to a size prompting general integration of their business enterprise computing activities and should be generally apparent.

Usually, the amount of information in Accounting Balance Data 107 is fairly extensive, and the information therein can be updated or changed at any moment in time. In a system such as the present invention, there is a need to establish a defined set of data from Accounting Balance Data 107 at essentially a moment in time, and there is also frequently a need to manage the times when the file is accessed by a user (person or process) when a substantial number of records need to be individually read so that general access to the file is managed to be as prompt as possible for all users. A first step in achieving this is to have a program in Business Enterprise Function Programs 105 which periodically runs to generate a conveniently sized listing of entries respective to a certain need; and, in the preferred embodiment of the present invention, such a program is used to periodically read records in Accounting Balance Data 107 to generate an Transaction Activity Log 203 (shown in FIG. 2) within Transaction Activity Preparation System 109. Details of Transaction Activity Preparation System 109 will be further discussed respective to FIG. 2.

Transaction Activity Preparation System 109 is read and referenced by Accrual Logical Engine 117 which also reads and references information from Reference Tables 115; Accrual Logical Engine 117 then performs a process further described respective to FIGS. 5 and 6 to generate tax accrual data values, and Accrual Logical Engine 117 then writes selected tax accrual data values into Accounting Balance Data b 107.

A set of tables are held within a data schema defined herein as Reference Tables 115, which holds tax information in the form of tax data respective to the tax jurisdiction codes in the form of data elements descriptive of the tax information. These tables, their affiliated data elements, logical identifiers, data element definitions, and exemplary formats are shown in the following paragraphs.

TABLE 1

Order Type Inclusion

The following table is an embodiment of an Order Type Inclusion Table. It shows all of the general Order Types that will be included in the use-tax accrual calculation.

Order Type Inclusion Table

| Order Type | Type Indic | From Date | To Date |
|---|---|---|---|
| FA | PO | 01/01/1996 | 12/31/2099 |
| FB | PO | 01/01/1996 | 12/31/2099 |
| FP | PO | 01/01/1996 | 12/31/2099 |
| ID | IN | 01/01/1996 | 12/31/2099 |
| IE | IN | 01/01/1996 | 12/31/2099 |
| IK | IN | 01/01/1996 | 12/31/2099 |
| IP | IN | 01/01/1996 | 12/31/2099 |
| IR | IN | 01/01/1996 | 12/31/2099 |

| Field Name | Description | Example |
|---|---|---|
| Order Type | A two digit character that identifies a specific type of limited-term account. | FA, FB |
| Type Indic | A two digit character that identifies an Order Type to the use-tax accrual system. | PO, IN |
| From Date | This is the starting date that the record is valid. | 01/01/1996 |
| To Date | This is the expiration date of the record. | 12/31/2099 |

TABLE 2

Cost Center and Order Type Exclusion Table

The following table is an embodiment of a Cost Center and Order Type Exclusion Table. It shows all of the Cost Centers and Order Types that will be excluded in the use-tax accrual calculation.

Cost Center Exclusion Table

| Comp | Plnt | From Date | From Cost Center (Order Type) | To Cost Center (Order Type) | To Date |
|---|---|---|---|---|---|
| 12 | AP | 01/01/1996 | MFG1 | MFG1 | 12/31/2099 |
| 12 | AP | 01/01/1996 | MFG2 | MFG2 | 12/31/2099 |
| 12 | AP | 01/01/1997 | PRG1 | PRG1 | 12/31/1997 |

TABLE 2-continued

Cost Center and Order Type Exclusion Table

The following table is an embodiment of a Cost Center and Order Type Exclusion Table. It shows all of the Cost Centers and Order Types that will be excluded in the use-tax accrual calculation.

| Field Name | Description | Example |
|---|---|---|
| Comp | Each company, legal entitiy, has a two digit numeric character assigned. | 12, 01 |
| Plnt | Each plant, process-section of the company has a two digit alpha/numeric character assigned. | AP, YM |
| From Date | This is the starting date that the record is valid. | 01/01/1996 |
| From Cost Center (Order Type) | This is the starting Cost Center or Order Type of the record. Cost Center is an ongoing account used to collect costs. Order Type is a limited-term account used to collect costs. A plant could have several Cost Centers and/or Order Types. | MFG1, MFG2 |
| To Cost Center (Order Type) | This is the ending Cost Center of the record. Cost Center is an ongoing account used to collect costs. Order Type is a limited-term account used to collect costs. A plant could have several Cost Centers and/or Order Types. | MFG1, MFG2 PRG1 |
| To Date | This is the expiration date of the record. | 12/31/2099 |

TABLE 3

Cost Element Exclusion Table

The following table is an embodiment of a Cost Element Exclusion Table. It shows all of the Cost Elements that will be excluded from the use-tax accrual calculation.

Cost Element Exclusion Table

| Comp | Plnt | From Date | From Cost Element | To Cost Element | To Date |
|---|---|---|---|---|---|
| 12 | 01 | 01/01/1996 | 600396 | 600396 | 12/31/2099 |
| 12 | 01 | 01/01/1996 | 605999 | 605999 | 12/31/2099 |
| 12 | 01 | 01/01/1996 | 620002 | 620003 | 12/31/2099 |
| 12 | 01 | 01/01/1996 | 621097 | 621097 | 12/31/2099 |
| 12 | 01 | 01/01/1996 | 621098 | 621098 | 12/31/2099 |
| 12 | 01 | 01/01/1996 | 623000 | 623097 | 12/31/2099 |
| 12 | 01 | 01/01/1996 | 641097 | 641097 | 12/31/2099 |

| Field Name | Description | Example |
|---|---|---|
| Comp | Each company, legal entity, has a two digit numeric character assigned. | 12, 01 |
| Plnt | Each plant, process-section of the company, has a two digit alpha/numeric character assigned. | 01, YM, S1 |
| From Date | This is the starting date that the record is valid. | 01/01/1996 |
| From Cost Element | This is the starting Cost Element of the record. Cost Elements are used to categorize the type of spending, e.g. salaries, materials and supplies. | 600396, 600599 |
| To Cost Element | This is the ending Cost Element of the record. Cost Elements are used to categorize the type of spending, e.g. salaries, materials and supplies. | 600396, 600599 |
| To Date | This is the expiration date of the record. | 12/31/2099 |

TABLE 4

The following table is an embodiment of a Cost Element Inclusion Table. It assigns an indicator to each Cost Element included in the use-tax accrual calculation.

| Cost Element Inclusion Table | | | | | | |
|---|---|---|---|---|---|---|
| | | From | Cost Element | | Labor/ | To |
| Comp | Plant | Date | From | To | Utility | Date |
| 12 | | 01/01/1996 | 600000 | 620000 | M | 12/31/2099 |
| 12 | | 01/01/1996 | 630000 | 635000 | L | 12/31/2099 |
| 12 | | 01/01/1996 | 640000 | 650000 | U | 12/31/2099 |
| 12 | AP | 01/01/1996 | 600000 | 620000 | M | 12/31/2099 |
| 12 | AP | 01/01/1996 | 630000 | 635000 | L | 12/31/2099 |

| Field Name | Description | Example |
|---|---|---|
| Comp | Each company, legal entity, has a two digit numeric character assigned. | 12, 01 |

TABLE 4-continued

The following table is an embodiment of a Cost Element Inclusion Table. It assigns an indicator to each Cost Element included in the use-tax accrual calculation.

| | | |
|---|---|---|
| Plant | Each plant, process-section of the company, has a two digit alpha/numeric character assigned. | 01, YM, S1 |
| From Date | This is the starting date that the record is valid. | 01/01/1996 |
| From Cost Element | This is the starting Cost Element of the record. Cost Elements are used to categorize the type of spending, e.g. salaries, materials and supplies, labor, and utilities. | 600000, 630000 |
| To Cost Element | This is the ending Cost Element of the record. Cost Elements are used to categorize the type of spending, e.g. salaries, materials and supplies, labor, and utilities. | 620000, 635000 |
| Labor/Utility | This two digit aplhabetical character assigns an indicator type to each Cost Element. | M, L, U, O, US |
| To Date | This is the expiration date of the record. | 12/31/2099 |

TABLE 5

Cost Object Inclusion and Taxable Percentage Table

The following table is an embodiment of a Cost Object Inclusion and Taxable Percentage Table. It shows the tax percentage respective to taxes by Cost Element type (material, labor, utility, and the like) for each Order Type and Cost Center.

| Cost Object Inclusion and Taxable Percentage Table | | | | | | | | | | | | | | | | |
|---|---|---|---|---|---|---|---|---|---|---|---|---|---|---|---|---|
| | | | | | | | | C | | Tax#1 | | thru | | Tax#6 | |
| Co | Pl | Order Type | Cost | From | Update | R | | O | D | Rerun1 | | thru | | Rerun6 | |
| mp | nt | Number | Centr | Date | Year | TO | St | T | I | Ty | % | Ty | % | Ty | % |
| 12 | 01 | A.089.0.0 | | 01/01/1995 | 1995 | IN | IN | P | | M | 50 | L | 65 | U | 80 |
| | | | | | | | | | | US | 90 | O | 75 | | 0 |
| | | | | | | | | | | M | 0 | L | 0 | U | 0 |
| | | | | | | | | | | US | 0 | O | 0 | | 0 |
| 12 | AP | | MFG3 | 01/01/1995 | 1996 | IN | IN | C | Y | M | 50 | L | 70 | U | 20 |
| | | | | | | | | | | US | 30 | O | 40 | | 0 |
| | | | | | | | | | | M | 0 | L | 0 | U | 0 |
| | | | | | | | | | | US | 0 | O | 0 | | 0 |

| Field Name | Description | Example |
|---|---|---|
| Comp | Each company, legal entity, has a two digit numeric character assigned. | 12, 01 |
| Plnt | Each plant, process-section of the company, has a two digit alpha/numeric character assigned. | AP, YM, S1 |
| Order Type Number | Order Type is a limited-term account used to collect costs for limited-term items, e.g. addition to a building, remodeling of a plant | A.089.0.0 |
| Cost Centr (Cost Center) | Cost Center is an ongoing account used to collect costs. A plant could have several Cost Centers. | MFG3 |
| From Date | This is the starting date that the record is valid. | 01/01/1996 |
| Update Year | The year the record was updated. | 1995 |

TABLE 5-continued

Cost Object Inclusion and Taxable Percentage Table

The following table is an embodiment of a Cost Object Inclusion and Taxable Percentage Table. It shows the tax percentage respective to taxes by Cost Element type (material, labor, utility, and the like) for each Order Type and Cost Center.

| | | |
|---|---|---|
| RTO | The two digit alphabetical character assigned to a regional tax office. Regional tax office is the office that handles a specific area of the country. | IN, MI, TX |
| State | Two digit alphabetical character assigned to a state. | IN, OH, TX |
| COT (Cost Objective Type: Cost Center or Order Type) | Each record has a C or P assigned whether it is a Cost Center or Order Type. | C, P |
| DI (deletion indicator) | Each record may be assigned a deletion indicator when it is no longer valid. | Y |
| Tax #1 thru Tax #6 | Each indicator type, L, M, U, US, O has a taxable percent assigned. | M 50% L 100% |
| Rerun #1 thru Rerun #6 | This has the same field format as the above field. It can be used for changing the percentages and rerunning the system. | M 50% L 100% |

TABLE 6

Tax Jurisdiction Code Table

The following table is an embodiment of a Tax Jurisdiction Code Table. It shows the tax jurisdiction for each Order Type and Cost Center.

Tax Jurisdiction Code Table

| Comp | Plnt | Order Type Number | Cost Center | St | Date From | TY | RTO | Tax Jur Code |
|---|---|---|---|---|---|---|---|---|
| 12 | 01 | A.089.0.0 | | IN | | P | IN | 41500 |
| 12 | AP | | MFG1 | IN | | C | IN | 41500 |
| 12 | AP | | PINEPOW | IN | | C | IN | 78657 |

| Field Name | Description | Example |
|---|---|---|
| Comp | Each company, legal entity, has a two digit numeric character assigned. | 12, 01 |
| Plnt | Each plant, process-section of the company, has a two digit alpha/numeric character assigned. | AP, YM, S1 |
| Order Type Number | Order Type is a used to collect cost for limited-term accounts, e.g. addition to a building or remodeling of a plant | A.089.0.0 |
| Cost Center | Cost Center is an ongoing account used to collect costs. A plant could have several Cost Centers. | Hani |
| St (State) | Two digit alphabetical character assigned to a state. | IN, OH, TX |
| Date From | This is the starting date that the record is valid. | 01/01/1996 |
| TY (Type) | Each record has a C or P assigned whether it is a Cost Center or Order Type. | C, P |
| RTO | The two digit alphabetical character assigned to a regional tax office. Regional tax office is the office that handles a specific area of the country. | IN, MI, TX |

TABLE 6-continued

Tax Jurisdiction Code Table

The following table is an embodiment of a Tax Jurisdiction Code Table. It shows the tax jurisdiction for each Order Type and Cost Center.

| | | |
|---|---|---|
| Tax Jur Code | Tax jurisdiction code which determines the tax rate. In this instance the postal zip code is used as a tax jurisdiction code. | 78657 |

TABLE 7

Tax Rate Table

The following table is an embodiment of a tax rate table. It shows all of the tax rates by tax jurisdiction code.

Tax Rate (by Jurisdiction) Table

| Tax Jur Code | State Abbr | From Date | Description | Tax Rate |
|---|---|---|---|---|
| 41500 | IN | 01/01/1996 | INDIANA | 5.0000 |
| 76523 | CA | 01/01/1996 | CALIFORNIA | 4.5000 |
| 77440 | TX | 01/01/1996 | TEXAS | 6.2500 |
| 78657 | IN | 01/01/1996 | INDIANA | 7.0000 |
| 78955 | IN | 01/01/1996 | INDIANA | 7.0000 |
| 85205 | IN | 01/01/1996 | INDIANA | 7.0000 |

| Field Name | Description | Example |
|---|---|---|
| Tax Jur Code (Tax Jurisdiction Code) | Tax jurisdiction which determines the tax rate. In this instance the postal code is used as a tax jurisdiction code. | 76523, 77440 |
| State Abbr | Two Digit alphabetical state abbreviation. | IN, CA |
| From Date | This is the starting date that the record is valid. | 01/01/1996 |

TABLE 7-continued

Tax Rate Table

The following table is an embodiment of a tax rate table. It shows all of the tax rates by tax jurisdiction code.

| | Tax Rate (by Jurisdiction) Table | |
|---|---|---|
| Description | Description of the tax jurisdiction. | Indiana, California |
| Tax Rate | Use-tax rate which is applicable for the tax jurisdiction on the record. | 5.0000, 4.0000 |

TABLE 8

Tax Cost Element Table

The following table is an embodiment of a Tax Cost Element Table. It assigns the Cost Elements included in the use-tax accrual calculation respective to a Cost Element. In some respects, this is a convenience table helping to enable the mapping of some tax accruals into a summary tax category for convenient auditing.

9TYP Tax Cost Element Table

| Co | Cost Element | | Tax Cost Element |
|---|---|---|---|
| mp | From | To | To Charge |
| 12 | 600000 | 606097 | 663068 |
| 12 | 613000 | 614097 | 663008 |
| 12 | 620022 | 620032 | 663058 |
| 12 | 630000 | 630006 | 663008 |
| 12 | 630012 | 630012 | 663058 |
| 12 | 640015 | 640015 | 663058 |
| 12 | 640036 | 640037 | 663058 |

| Field Name | Description | Example |
|---|---|---|
| Comp | Each company, legal entity, has a two digit numeric charater assigned. | 12, 01 |
| From Cost Element | This is the starting Cost Element of the record. Cost Elements are used to categorize the type of spending, e.g. salaries, materials and supplies. | 600000, 630000 |
| To Cost Element | This is the ending Cost Element of the record. Cost Elements are used to categorize the type of spending, e.g. salaries, materials and supplies. | 620000, 635000 |
| Tax Cost Element To Charge | Tax Cost Element specifically set up to collect use-taxes. | 663008, 663068 |

Reference Tables 115 are updated and changed by Tax Rate Acquisition System 113 (Further discussed with respect to FIG. 3) and by Table Loading Logical Engine 121; Tax Rate Acquisition System 113 acquires tax rate information from Tax Rate Information Source 111 (also further discussed with respect to FIG. 3). Table Loading Logical Engine 121 is substantially a straightforward data schema interface logical engine which enables a human to use Monitor and Report Interface 123 (a standard terminal or workstation interface) to access and read both Accounting Balance Data 107 and Reference Tables 115 data and then make specific database entries to modify the data in Reference Tables 115 as the human references some external sources of tax data and other tax information; it should be noted that some of the external sources of information are publications from the jurisdictions themselves, which define the tax rates and tax information related to taxable percentages in their reports and records related to jurisdictional rule making. This human intervention is performed occasionally; although, in another embodiment, Table Loading Logical Engine 121 has some embedded subprograms which activate automatically to access both Accounting Balance Data 107 and Reference Tables 115 data and then make specific database entries into Reference Tables 115 to update certain fields in Reference Tables 115 in a manner which should generally be apparent. It should be noted that the level of access protection given to an individual operating Monitor and Report Interface 123 in accessing and modifying specific database entries (within Reference Tables 115) is preferably more restrictive and specific than the protection given to individuals using Monitor and Report Interface 125 (for the Reversal Logical Engine 119), Monitor and Report Interface 127 (for the Reference Tables 115), and Monitor and Report Interface 129 (for the Accrual Logical Engine 117); for these last three interfaces do not have the same ability to fundamentally alter the information in Reference Tables 115 without any limitation to the scope of the modifications being implemented. These Monitor and Report Interfaces (125, 127, and 129) generally function to facilitate logic and provide output either (a) to print reports (when operated in conjunction with printing hardware or with a screen display), (b) to enable well defined processes to be initiated (via a keyboard and screen display), or (c) to enable examination and, optionally, alteration of specific predefined data fields.

A feature in the present invention respective to the portion of the database identified by cost elements "Rerun #1" thru "Rerun #6" in the Cost Object Inclusion And Taxable Percentage Table (Table 5) enables corrected filings after a tax report has been defined and the information in Accounting Balance Data 107 has been "finalized". In this regard, judgments on the part of personnel within the business enterprise are subject to auditing and review; in some cases, certain of those judgments by personnel within the business enterprise respecting tax rates are occasionally challenged and/or corrected through the process of auditing and review conducted subsequent to the filing of a tax report. When a correction (pursuant to the auditing and review process) is in order, a corrected tax report must be generated. By preserving a copy of the Transaction Activity Log 203 (or derived transaction information) used in defining a tax report, providing the "Rerun #1" thru "Rerun #6" data element types in the Cost Object Inclusion And Taxable Percentage Table (Table 5), and providing a logical indicator for selecting use of the "Rerun #1" thru "Rerun #6" data element types, corrective reports can be output by the tax accrual system logic where the Accrual Logical Engine 117 reprocesses the information contained in the archived copy of the Transaction Activity Log 203 (or derived transaction information) and, referencing the selecting indicator, uses the Tax # (from the original report) and Rerun # data elements to define a corrective report. In this manner, the present invention provides logic, data, and a method for generating an amended tax report which enables corrections to be filed reconciling previously-filed tax reports respective to the findings of an auditor or other entity reviewing filed tax reports for the business enterprise.

Figure 7:
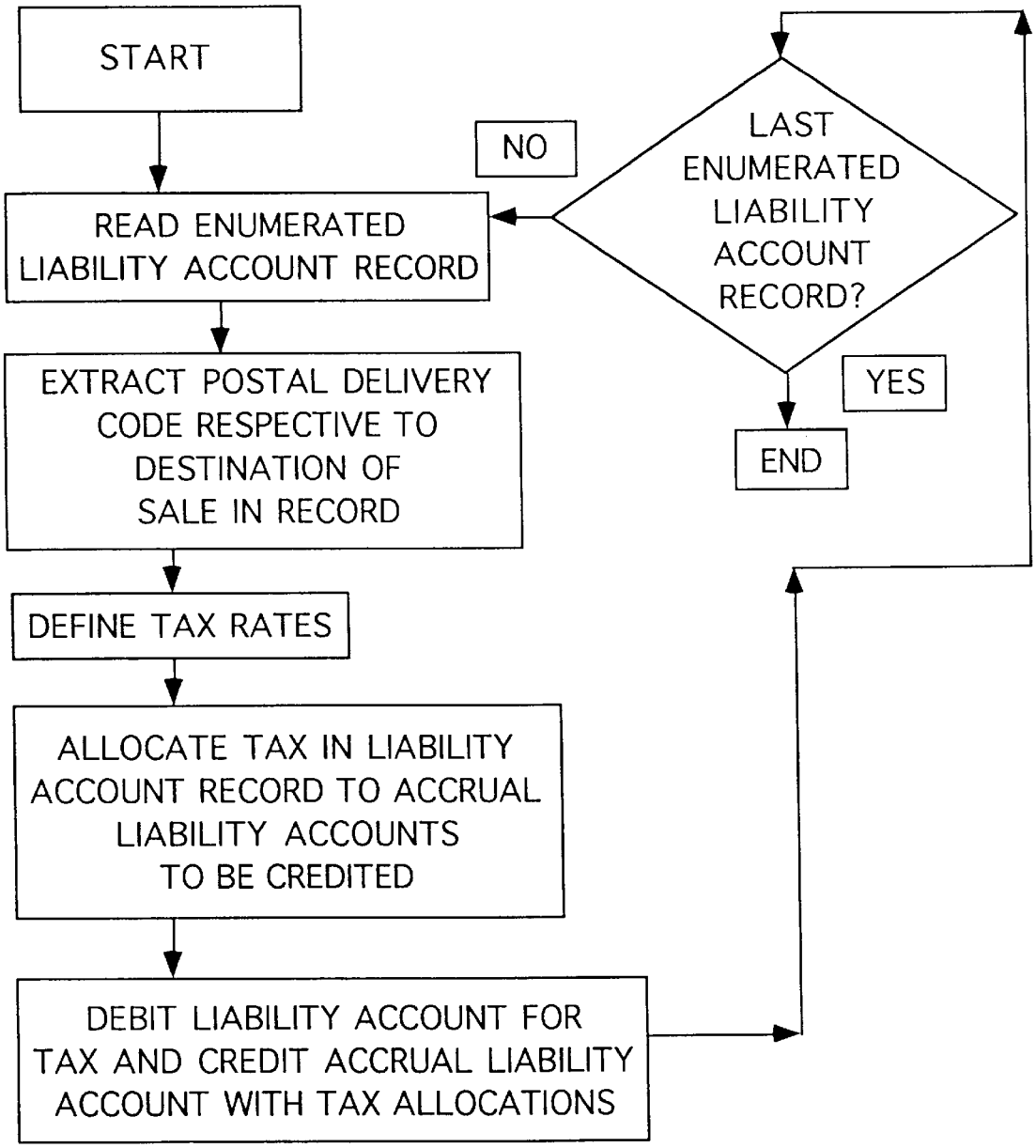
FIG. 7 depicts detail related to adjusting use-taxes to reflect the impact of related sales taxes.

Tax Accrual System Logic Overview 101 also shows Reversal Logical Engine 119 which also reads and references information from Reference Tables 115 and Accounting Balance Data 107, executes a process further described respective to FIG. 7 which reduces the tax liability to reflect taxes which have already been paid, and then writes accrual data values into Accounting Balance Data 107 as debits and credits.

Figure 2:
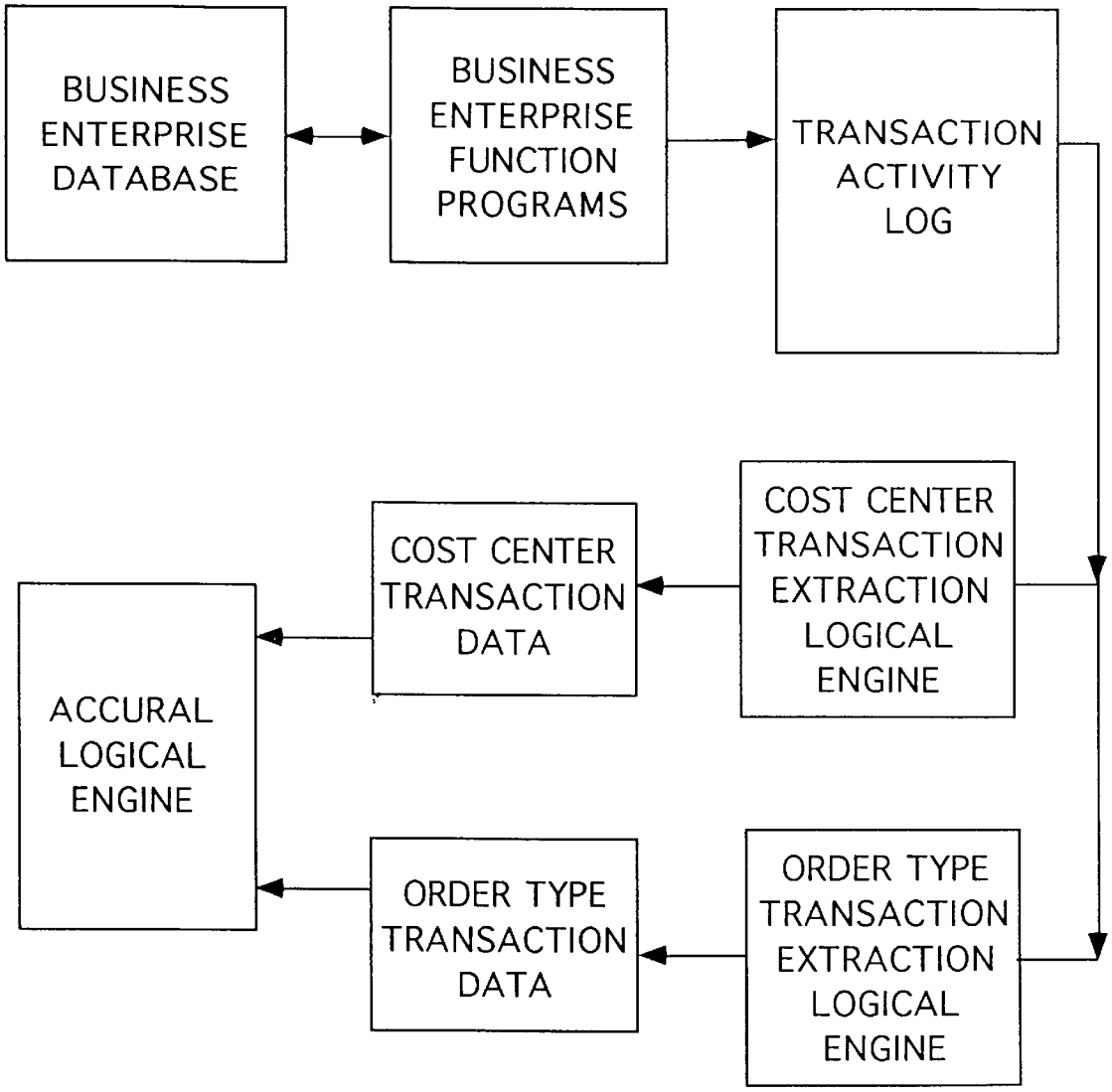
FIG. 2 presents details of a transaction activity preparation system.

FIG. 2 presents further Details of Transaction Activity Preparation System 109 as Transaction Activity Preparation System Detail 201. As previously noted a program in Business Enterprise Function Programs 105 runs at a convenient time to periodically read records in Accounting Balance Data 107 and generate a conveniently sized Transaction Activity Log 203 within Transaction Activity Preparation System 109. The data schema of one embodiment of Transaction Activity Log 203 has field definitions as indicated in Table 9.

TABLE 9

| Transaction Activity Log Field Definitions | |
|---|---|
| DATA: BEGIN OF EXP-ACT-RCD, | "Expense Activity Rcd Layout" |
| HIERARCHY(03) | TYPE C, |
| RFGL-COMPANY(04) | TYPE C, |
| PLANT-CODE(02) | TYPE C, |
| RECORD-TYPE(01) | TYPE C, |
| COST-CENTER(08) | TYPE C, "may contain order number" |
| MATERIAL-PRODUCED(08) | TYPE C, |
| COST-ELEMENT(08) | TYPE C, |
| SENDING-COMPANY(04) | TYPE C, |
| SENDING-PLANT(02) | TYPE C, |
| SENDING-CCNTR(08) | TYPE C, |
| SENDING-ACTIVITY(03) | TYPE C, |
| SENDING-SUBACTIVITY(03) | TYPE C, |
| SENDING-MATL-ID(08) | TYPE C, |
| EXTRACT-DATE(08) | TYPE D, |
| EXTRACT-TIME(06) | TYPE C, |
| TYPE-INDICATOR(01) | TYPE C, |
| EXPENSE-DATA-TYPE(01) | TYPE C, |
| PLAN-VERSION(01) | TYPE C, |
| ORDER-TYPE(02) | TYPE C, |
| ORDER-RESP-PLANT(020) | TYPE C, |
| ORDER-RESP-CCNTR(08) | TYPE C, |
| ORDER-DESCRIPTION(30) | TYPE C, |
| PROJECT-NUMBER(16) | TYPE C, |
| ORDER-HIERARCHY(16) | TYPE C, |
| UPDATE-PERIOD(06) | TYPE C, |
| LOCAL-CURR-CODE(05) | TYPE C, |
| UNIT-OF-MEASURE-(02) | TYPE C, |
| ACTUAL QUANTITY(08) | TYPE P DECIMALS 3, |
| ACTUAL-LOCAL-CURR(08) | TYPE P DECIMALS 2, |
| ACTUAL-US-DOLLARS(08) | TYPE P DECIMALS 2, |
| TARGET-QUANTITY(08) | TYPE P DECIMALS 3, |
| TARGET-LOCAL-CURR(08) | TYPE P DECIMALS 2, |
| TARGET-US-DOLLARS(08) | TYPE P DECIMALS 2, |
| PLAN-QUANTITY(08) | TYPE P DECIMALS 3, |
| PLAN-LOCAL-CURR(08) | TYPE P DECIMALS 2, |
| PLAN-US-DOLLARS(08) | TYPE P DECIMALS 2, |
| PRICE-VAR-LOCAL(08) | TYPE P DECIMALS 2, |
| PRICE-VAR-USD(08) | TYPE P DECIMALS 2, |

The data of Transaction Activity Log 203 is read by Cost Center Transaction Extraction Logical Engine 205 and Order Type Transaction Logical Engine 207.

The data of Transaction Activity Log 203 is still fairly extensive (see discussion of Business Enterprise Function Programs 105 and Transaction Activity Preparation System 109 respective to FIG. 1), and the information therein can be updated or changed at any moment in time by Business Enterprise Function Programs 105. Architecturally, Cost Center Transaction Extraction Logical Engine 205 and Order Type Transaction Logical Engine 207 establish a defined set of data from Transaction Activity Log 203 (at essentially a moment in time) at such times when Transaction Activity Log 203 is best accessed in a prompt manner so that all users of this file can have optimal response and stability of the collected data in the file.

Both Cost Center Transaction Extraction Logical Engine 205 and Order Type Transaction Logical Engine 207 (a) parse and selectively extract data necessary to define tax accrual from Transaction Activity Log 203 and (b) write output to one of two respective data schema: Cost Center Transaction Data 209 and Order Type Transaction Data 211. In this regard, Cost Center data relates to an ongoing account type which collects costs for established accounts within the accounting system, and Order Type data relates to a limited-term account type which collects costs for accounts which are appropriate to Order Types identified as more short-term in potential duration than the ongoing accounts within the accounting system. Respective to the two categories, the records in the Transaction Activity Log 203 have somewhat different active fields, and, in the preferred embodiment, it was considered more convenient to open files and handle the data in the context of the two categories by use of processes deployed in the generally parallel design depicted instead of via a single unified process that would discriminate records by field layout; other embodiments for solving this need include a single logical engine having two subroutines respective to the different record types, unified record types, and the like, as should be apparent. Process details for reading records from Transaction Activity Log 203, parsing the record, selecting data for the accrual process, and writing data as output into one of the Cost Center Transaction Data 209 and Order Type Transaction Data 211 data schema should be apparent. Cost Center Transaction Data 209 and Order Type Transaction Data 211 data schema, therefore, hold tax accrual source information for use by Accrual Logical Engine 117 in a stable and fixed form for a particular instance of tax accrual determination; in this regard, a "snapshot" of transaction activity for a period of time is created and can be preserved.

Figure 3:
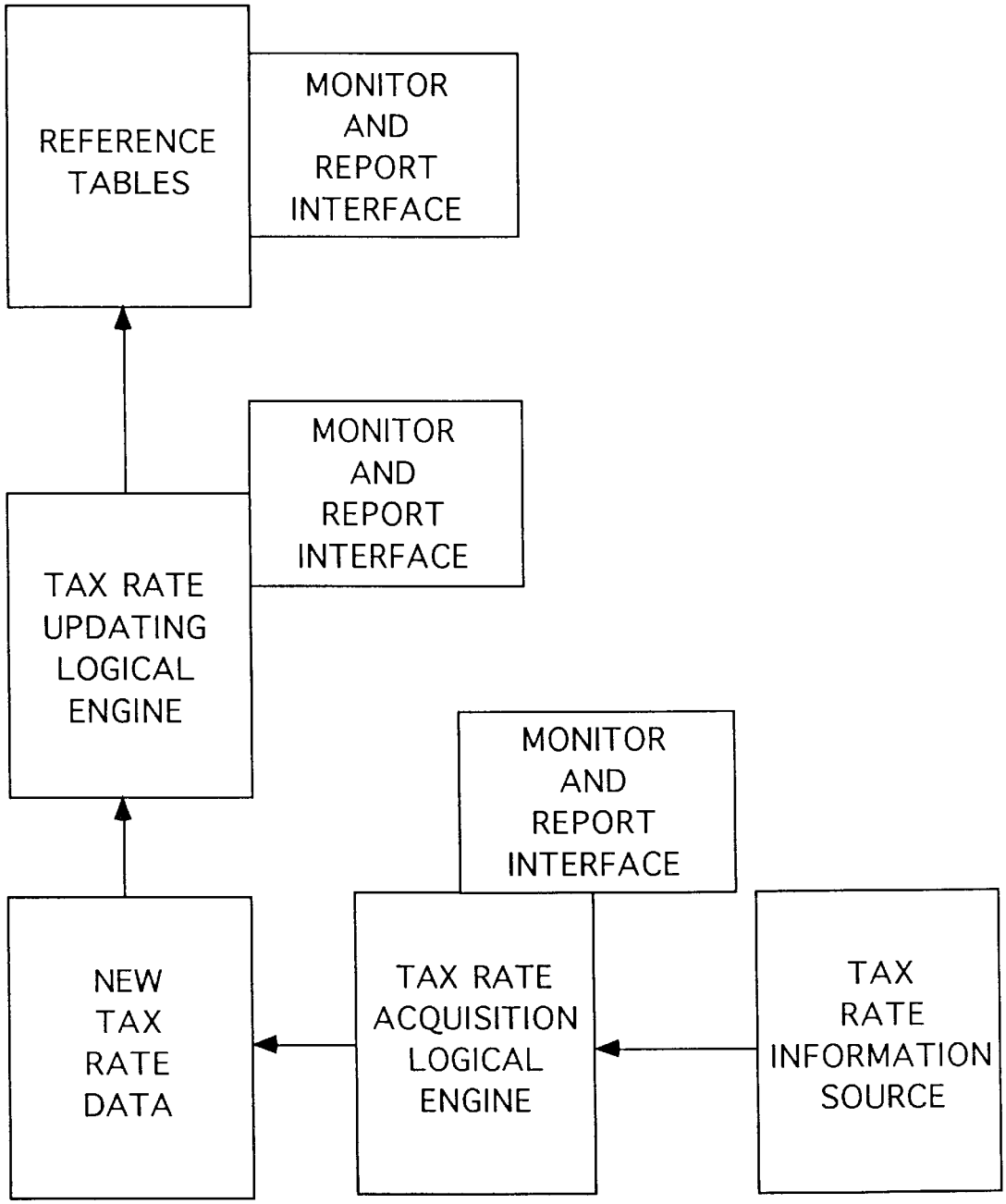
FIG. 3 shows details of a tax rate acquisition system.

Turning now to FIG. 3, Tax Rate Acquisition System Detail 301 shows other parts of Tax Rate Acquisition System 113 as it acquires tax rate information from Tax Rate Information Source 111 for updating and changing of Reference Tables 115. Tax Rate Information Source 111 can be a database in a computer-implemented system accessible via a network linkage (such as via the Internet), it can be a set of data available in a data schema available on a computer readable disk, or it could be a data file which is periodically updated by a human (via a system and method not shown, but which should be apparent). The information in Tax Rate Information Source 111 changes periodically as different jurisdictions modify their respective tax provisions. The information in Tax Rate Information Source 111 is, therefore, a summary of this detailed information in conveniently available form. One source of such a set of data is Fast-Tax Rate File which is available from CLR Fast-Tax Corporation located in Carrollton, Tex.

Tax Rate Acquisition Logical Engine 307 reads the information from Tax Rate Information Source 111 either automatically or as prompted by a human via Monitor and Report Interface 309 to obtain a recent set of tax rate data elements. Tax Rate Acquisition Logical Engine 307 selects a subset of the information from Tax Rate Information Source 111 of interest to the particular business enterprise and writes the newly acquired tax information to New Tax Rate Database 305 to hold an unchanging and business-enterprise-relevant subset of the information. Tax Rate Uploading Logical Engine 303 reads the data in New Tax Rate Database 305 and updates appropriate tables in Reference Tables 115. Monitor and Report Interface 309 (for the Tax Rate Acquisition Logical Engine 307) and Monitor and Report Interface 311 (for the Tax Rate Uploading Logical Engine 303) enable reporting and interaction to human technicians as the processes execute to modify the tax rate information. Details for implementing the above data schema and logical engines should be apparent.

Figure 4:
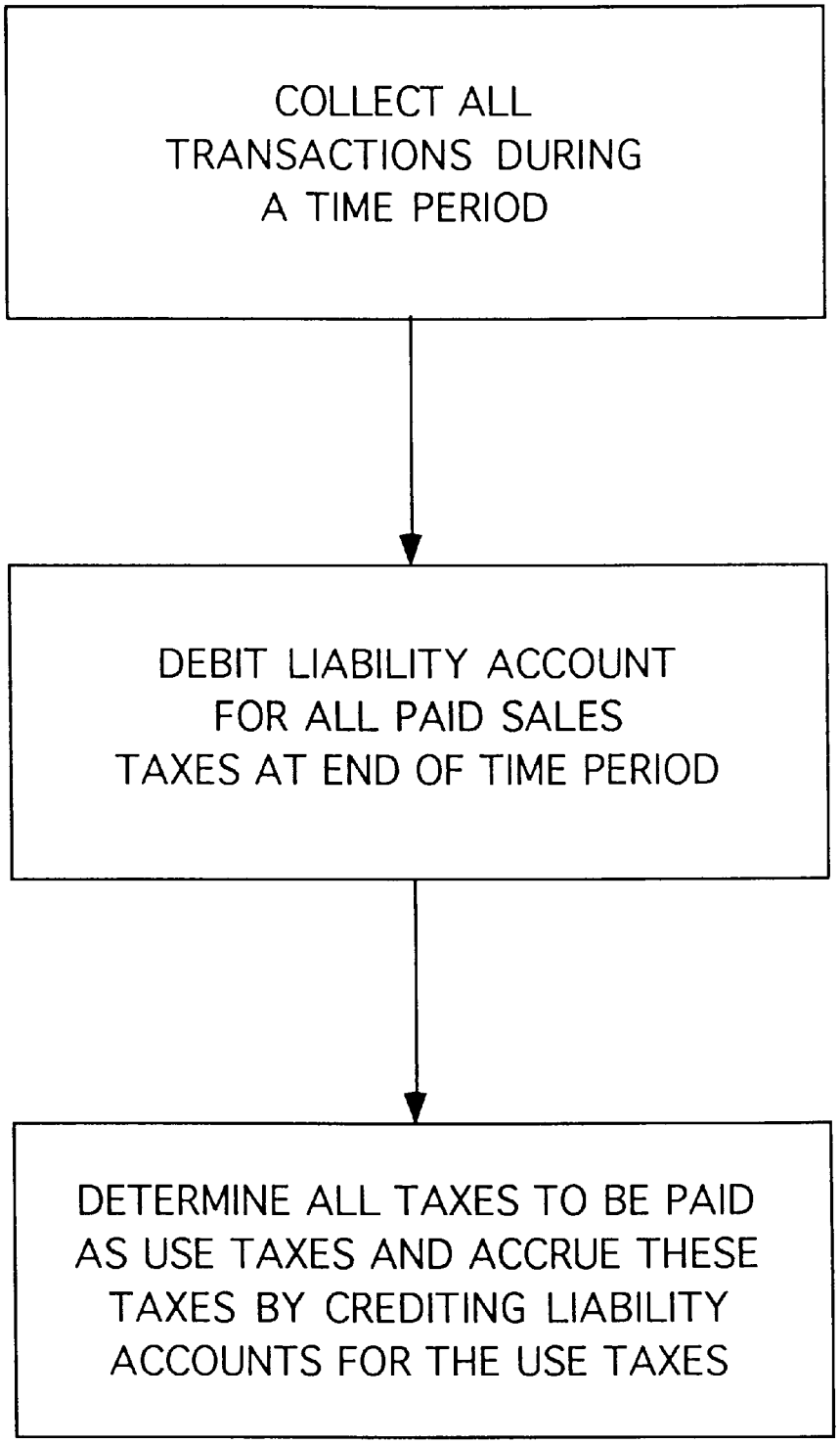
FIG. 4 outlines a general overview of the tax accrual process.

FIG. 4 shows a general overview of the larger General Tax Accrual Process 401. In this regard, a first Transaction Collection Step 403 needs to occur on a periodic basis so that all accounting transactions for a period of time are collected together to serve as inputs to the general tax accrual process. As a second general Liability Account Debiting Step 405, sales taxes which have already been paid (a requirement in some jurisdictions) need to be figured and retained as liability debits to decrease the use-tax which will be paid. Then, in Tax Determination and Accrual Step 407, use-taxes can be defined for all transactions as liability credits (Note that a liability credit will generate an increase in the tax that will need to be paid to an outside jurisdiction, while a liability debit is a decrease in the tax that will need to be paid to the outside jurisdiction).

Figure 5:
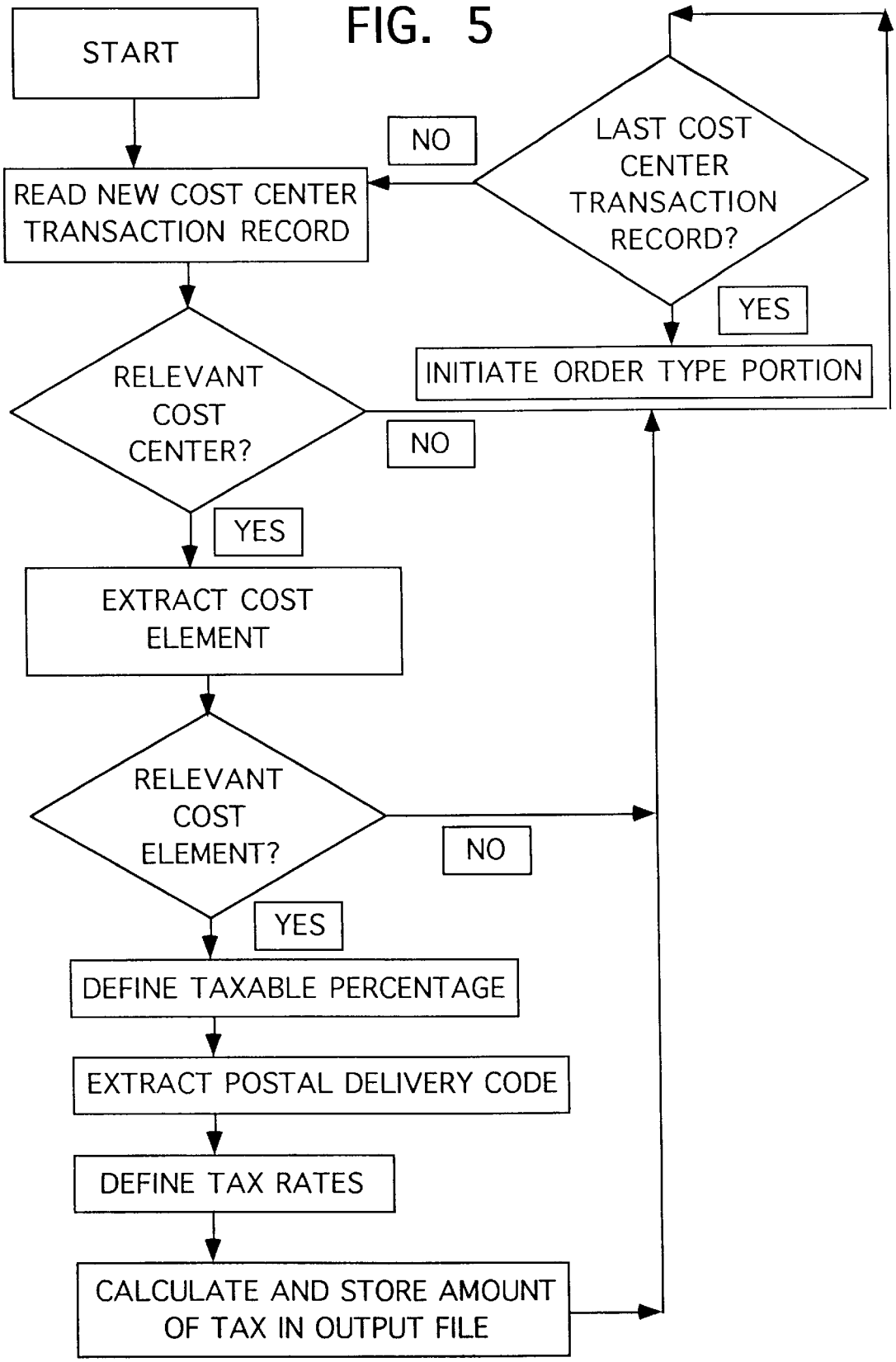
FIG. 5 depicts details which are related to cost center accounting executed by the accrual logical engine in the present invention.
Figure 6:
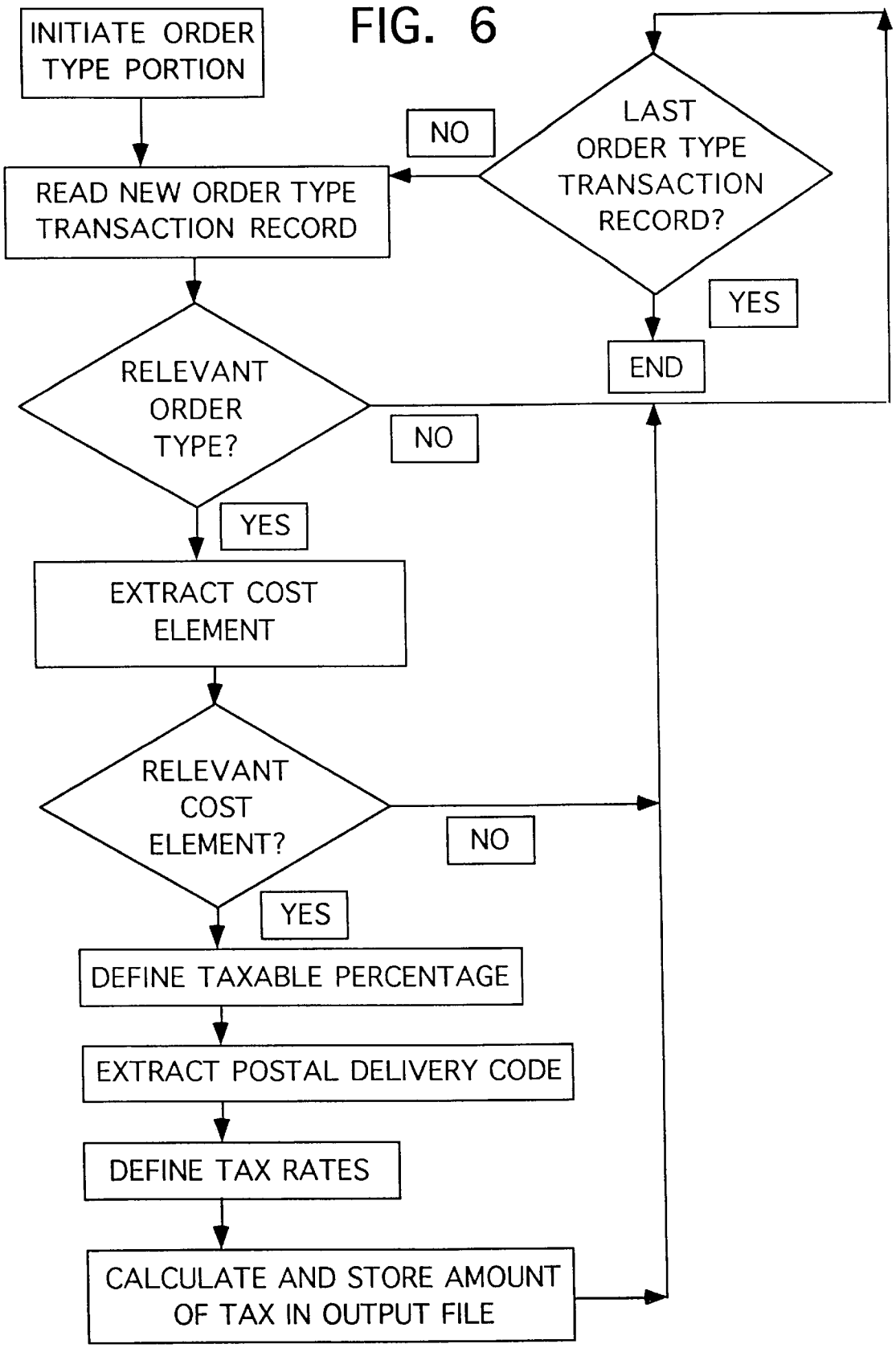
FIG. 6 depicts details which are related to order type and project accounting executed by the accrual logical engine in the present invention.

Accrual Logical Engine Cost Center Process 501 is shown in FIG. 5 and Accrual Logical Engine Order Type Cost Process 601 is shown in FIG. 6. These two processes are logically executed by the computer in series as a unified entity (connected at Initiate Order Type Portion Step 521) by Accrual Logical Engine 117 to perform a process generating tax accrual data values and writing selected tax accrual data values into Accounting Balance Data 107.

FIG. 5 shows initiation of the Accrual Logical Engine Cost Center Process 501 with Start Step 503 where Accrual Logical Engine 117 opens Accounting Balance Data 107, Reference Tables 115, and Cost Center Transaction Data 209 for access. In Read New Cost Center Record Step 505, Accrual Logical Engine 117 reads a first (or new) record from Cost Center Transaction Data 209, and parses the Cost Center field. Referencing information in Table 5 (Cost Object Inclusion And Taxable Percentage Table) in Reference Tables 115, Accrual Logical Engine 117 executes Relevant Cost Center Decision Step 507 by comparing the Cost Center for the record with the included Cost Centers to decide if this record should proceed to Extract Cost Element Step 508 or to Last Cost Center Transaction Decision Step 519. If a match is identified, and the Cost Center is thereby to be included, Accrual Logical Engine 117 proceeds to extract the Cost Element in Extract Cost Element Step 508. Accrual Logical Engine 117 then proceeds to Relevant Cost Element Decision Step 509, references information in Table 4 (Cost Element Inclusion Table) in Reference Tables 115, and compares the Cost Element for the record with the included Cost Elements in that table to decide if this record should proceed to Step 519 or to (Cost Center) Taxable Percentage Definition Step 511. If a match is identified, and the Cost Center is thereby to be included, Accrual Logical Engine 117 proceeds to Step 511, references information in Table 5 (Cost Object Inclusion And Taxable Percentage Table) in Reference Tables 115 to acquire the relevant taxable percentage, and holds this percentage in its logic. Accrual Logical Engine 117 proceeds to (Cost Center) Postal Delivery Code Identification Step 513, references information in Table 6 (Tax Jurisdiction Code Table) in Reference Tables 115 to acquire the tax jurisdiction code, and holds this code in its logic. In this regard, the described embodiment uses the U.S. Postal Zone Improvement Plan (ZIP) code relevant to this Cost Center. It should be noted that, in the described embodiment, the Cost Centers are always defined to have relevance only within a unique one and only one particular state, so there is no need to execute Step 513 prior to Step 511. However, in another embodiment where the Cost Centers are relevant in more than one state, Accrual Logical Engine 117 executes Step 513 prior to Step 511. In another embodiment, a geopolitical demographic allocation file is used to enable allocation.

Accrual Logical Engine 117 next executes (Cost Center) Tax Rate Definition Step 515 by referencing information in Table 7 (Tax Rate Table) in Reference Tables 115 to acquire the tax rate relevant to the tax jurisdiction and holds this rate in its logic. Then, Accrual Logical Engine 117 proceeds to (Cost Center) Tax Computation and Storage Step 517 where the amount of expenditure respective to the Cost Element, the taxable percentage, and the tax rate are multiplied together to define the tax; the tax is then entered as a tax liability into the proper jurisdictional account in Accounting Balance Data 107 in conjunction with reference to information in Table 8 (Tax Cost Element Table).

Finally, respective to FIG. 5, Accrual Logical Engine 117 proceeds to Last Cost Center Transaction Decision Step 519 and ascertains if the last Cost Center record has been processed. Note that alternative routes to Step 519 are via Relevant Cost Center Decision Step 507 or Relevant Cost Element Decision Step 509 as previously discussed. Accrual Logical Engine 117 terminates Step 519 to Initiate Order Type Portion Step 521 if the last Cost Center record has been processed or to Read Cost Center Transaction Step 505 to acquire the next Cost Center transaction record if the last Cost Center record has not been processed.

FIG. 6 shows continuation of the unified process (connected at Initiate Order Type Portion Step 521) executed by Accrual Logical Engine 117 to generate tax accrual data values and write selected tax accrual data values into Accounting Balance Data 107. Accrual Logical Engine 117 continues the process begun with Accrual Logical Engine Cost Center Process 501 with Initiate Order Type Portion Step 521 where Accrual Logical Engine 117 opens Order Type Transaction Data 211 for access. In Read New Order Type Transaction Step 621, Accrual Logical Engine 117 reads a first record from Order Type Transaction Data 211 and parses the relevant Order Type field. Referencing information in Table 5 (Cost Object Inclusion And Taxable Percentage Table) and Table 1 (Order Type Inclusion Table) in Reference Tables 115, Accrual Logical Engine 117 executes Relevant Order Type Decision Step 603 by comparing the Order Type for the record with the included Order Types (in this case the "Project Number") to decide if this record should proceed to Extract (Order Type) Cost Element Step 605 or to Last Order Type Transaction Decision Step 617. If a match is identified, and the Order Type is thereby to be included, Accrual Logical Engine 117 proceeds to extract the relevant Cost Element in Extract (Order Type) Cost Element Step 605. (In another embodiment, Order Type inclusion is established in Step 603 where an Order Type is always affiliated with a Cost Center and the inclusion decision proceeds by, firstly, identifying the affiliated Cost Center respective to the Order Type and, secondly, comparing the affiliated Cost Center to the included Cost Centers in Table 5.) Accrual Logical Engine 117 then proceeds to Relevant (Order Type) Cost Element Decision Step 607, references information in Table 4 (Cost Element Inclusion Table) in Reference Tables 115, and compares the related Cost Element for the record with the included Order Type Cost Elements in that table to decide if this record should proceed to Last Order Type Transaction Decision Step 617 or to (Order Type) Taxable Percentage Definition Step 609. If a match is identified, and the Order Type is thereby to be included, Accrual Logical Engine 117 proceeds to Step 609, references information in Table 5 (Cost Object Inclusion And Taxable Percentage Table) in Reference Tables 115 to acquire the relevant taxable percentage, and holds this percentage in its logic. Accrual Logical Engine 117 proceeds to (Order Type) Postal Delivery Code Identification Step 611, references information in Table 6 (Tax Jurisdiction Code Table) in Reference Tables 115 to acquire the tax jurisdiction code, and holds this code in its logic. In this regard, as was also noted respective to the FIG. 5 description, the described embodiment uses the U.S. Postal Zone Improvement Plan (ZIP) code relevant to this Order Type. It should be noted that, in the described embodiment, Order Type accounts are defined to have relevance uniquely within one and only one state, so there is no need to execute Step 611 prior to Step 609. However, in another embodiment where Order Type accounts are relevant in more than one state, Accrual Logical Engine 117 executes Step 611 prior to Step 609. In another embodiment, a geopolitical demographic allocation file is used to enable allocation.

Accrual Logical Engine 117 next executes (Order Type) Tax Rate Definition Step 613 by referencing information in Table 7 (Tax Rate Table) in Reference Tables 115 to acquire the tax rate relevant to the tax jurisdiction and holds this rate in its logic. Then, Accrual Logical Engine 117 proceeds to (Order Type) Tax Computation and Storage Step 615 where the amount of expenditure respective to the Cost Element, the taxable percentage, and the tax rate are multiplied together to define the tax; the tax is then entered as a tax liability into the proper jurisdictional account in Accounting Balance Data 107.

In another embodiment, assurance that the Cost Object data elements are interactively harmonious and mutually comprehensive can be achieved by executing a comparison of the Cost Center against both an inclusion table such as Table 4 (Cost Element Inclusion Table) and an exclusion table such as Table 2 (Cost Center and Order Type Exclusion Table) when executing (e.g.) Relevant Cost Center Decision Step 507 and thereby comparing the Cost Center for the record with an included Cost Center reference and an excluded Cost Center reference to decide if this record should proceed to Extract Cost Element Step 508 or to Last Cost Center Transaction Decision Step 519. Similarly, (e.g.) in Relevant Cost Element Decision Step 509, references to Table 4 and Table 3 (Cost Element Exclusion Table) in Reference Tables 115 and comparison of the Cost Element for the record with the included and excluded Cost Elements in those tables; references to Table 5 (Cost Object Inclusion And Taxable Percentage Table), Table 1 (Order Type Inclusion Table), and Table 2 (Cost Center and Order Type Exclusion Table) in Relevant Order Type Decision Step 603 and comparison of the Order Type for the record with the included and excluded Order Types in those tables; and references to Table 4 and Table 3 in Extract (Order Type) Cost Element Step 605 and comparison of the Cost Element for the record with the included and excluded Cost Elements in those tables help in establishing a data schema cross-check as the personnel using the present invention establish two separate types of tables indicating (as a first paradigm of inclusion) what is to be included and (as a second paradigm of exclusion) what is not to be excluded so that the computer executed logic can confirm both paradigms against the cost objects being processed and thereby achieve interactive harmony and mutual comprehensiveness in the references applied to the particular accounting records which are being used to define the accrued use-taxes. In this regard, the "inclusion" check could be executed first in one embodiment, or the "exclusion" check could be performed first in another embodiment. Another embodiment uses a less definite "exclusion" only check with default inclusion (the benefit being a smaller and less costly data schema size); yet another embodiment uses the less definite "exclusion" check with general default inclusion but with the addition of a limited set of additional specific inclusion checks for those data objects of special importance to the business enterprise. To facilitate closure, in another embodiment, the exclusion and inclusion data entries can be further compared to a master list to help establish that "all cost objects are present and accounted-for" and that no cost object is both included and excluded; as should be apparent, if a cost object has a reason to be both included and excluded, the cost object may not be properly detailed for the larger goals of the accounting needs of the business enterprise and an indication is thereby established that a further set of fundamental cost objects respective to that "dichotomously designated" cost object is needed.

Finally, respective to FIG. 6, Accrual Logical Engine 117 proceeds to Last Order Type Transaction Decision Step 617 and ascertains if the last Order Type record has been processed. Note that alternative routes to Step 617 are via Relevant Order Type Decision Step 603 or Relevant (Order Type) Cost Element Decision Step 607 as previously discussed. Accrual Logical Engine 117 terminates Step 617 to End Step 619 if the last Order Type record has been processed or to Read Order Type Transaction Step 621 to acquire the next Order Type transaction record if the last Order Type record has not been processed. In End Step 619, Accrual Logical Engine 117 closes all open files and generates a report to Monitor and Report Interface 129 (reporting interface logic for the Accrual Logical Engine 117).

Turning now to FIG. 7, Reversal Logical Engine 119 executes Reversal Logical Engine Process 701 to decrease the tax liability in a particular jurisdiction by debiting the liability with taxes which have already been paid as sales taxes at the time when the business enterprise acquired goods or services. In understanding the purpose of this feature in the present invention, it should be noted that the payment of sales tax in some jurisdictions must take place at the time of sale and must be collected by the seller; whereas, in other jurisdictions, the payment of sales tax in some jurisdictions may be accrued in an account by the purchaser for a period of time of sale and then paid as a part of a single payment (as a "use-tax"). Since jurisdictions extend certain tax benefits during certain times to influence and encourage certain types of activities (e.g. investment in Order Types which enhance environmental quality, expansion of the business enterprise base of the jurisdiction by encouraging industrial processing within that jurisdiction, and cooperative support with the jurisdiction of socially beneficial initiatives), effective "use-taxes" and "sales taxes" are, at times, different respective to certain goods and services. Another situation where a use-tax in some cases should be declared and paid occurs when an article is purchased in one jurisdiction and then transported into another jurisdiction for use (or when the cumulative value of a set of such articles purchased with a defined period of time and so transported exceeds a certain value threshold). One of the benefits of the present invention is that a holistic system is enabled which addresses both accrual of tax debits and credits while also enabling resolution of tax debits and credits paid in other ways than as a result of the accrual process in isolation. Reversal Logical Engine 119 is the logical engine within the present invention which executes logic to achieve that resolving feature. Two main account types facilitate these operations: an "enumerated liability account" type of account holding a listing of records respective to individual purchases of goods and services, and an "accrual liability account" type of account holding a single value which represents the appropriate cumulative impact of all entries and considerations in a respective "enumerated liability account". In the described embodiment, there is an accrual liability account for each jurisdiction (ZIP code), although other ways of organizing such records and determining such accruals could alternatively be implemented through use of data record fields which establish pointers to define the jurisdictions respective to each accrual. In the described embodiment, the enumerated liability accounts are also organized by individual ZIP code; in the following discussion, the set of enumerated liability accounts will be treated as one extended enumerated liability account.

FIG. 7 shows initiation of Reversal Logical Engine Process 701 with Start Step 703 where Reversal Logical Engine 119 opens Accounting Balance Data 107 and Reference Tables 115 for access. Start Step 703 terminates to Read Enumerated Liability Account Record Step 705 where a record in the enumerated liability account is read. Then, in (Reversal) Postal Delivery Code Extraction Step 707, the location indicators in the enumerated liability account record are used in conjunction with information in the Tax Rate Table (Table 7) and the Tax Jurisdiction Code Table (Table 6) in Reference Tables 115 to identify the postal delivery code respective to the destination of the transaction in the enumerated liability account record. Next, in (Reversal) Tax Rate Definition Step 709, information in the Tax Rate Table (Table 7) in Reference Tables 115 is again referenced to define the proper tax rate for the enumerated liability account transaction. In the following Accrual Crediting Allocation Step 711, the ZIP Code field is compared to information in the Tax Jurisdiction Code Table (Table 6) in Reference Tables 115 and the respective enumerated liability account record is allocated for accrual. If no respective enumerated liability account record is identified for allocation, an entry is sent to an exception report via Monitor and Report Interface 125. Next, in Enumerated Liability Account Debiting and Accrual Liability Account Crediting Step 713, the allocated enumerated liability account is credited for the amount of the transaction and the accrual liability account is debited for the amount of the transaction (which had been previously paid to the jurisdictional tax authority). Reversal Logical Engine 119 then executes Last Enumerated Liability Account Record Decision Step 715 to determine if the logic should progress to End Step 717 or to Read Enumerated Liability Account Record Step 705 for reading the next enumerated liability account record. If the result of Last Enumerated Liability Account Record Decision Step 715 is to transfer the logic to End Step 717, Reversal Logical Engine 119 closes all open files and generates a report to Monitor and Report Interface 125 (for the Reversal Logical Engine 119).

Finally, a program in Business Enterprise Function Programs 105 executes to allocate the taxes defined by use of the present invention to different relevant jurisdictions respective to a location respective to each enumerated liability account and accrual liability account (e.g., a business enterprise in an urban location interacts with a city jurisdictional entity, a county jurisdictional entity, and a state jurisdictional entity). An example of such a program is in the CLR Fast-Tax product previously identified in this specification.

Figure 8:
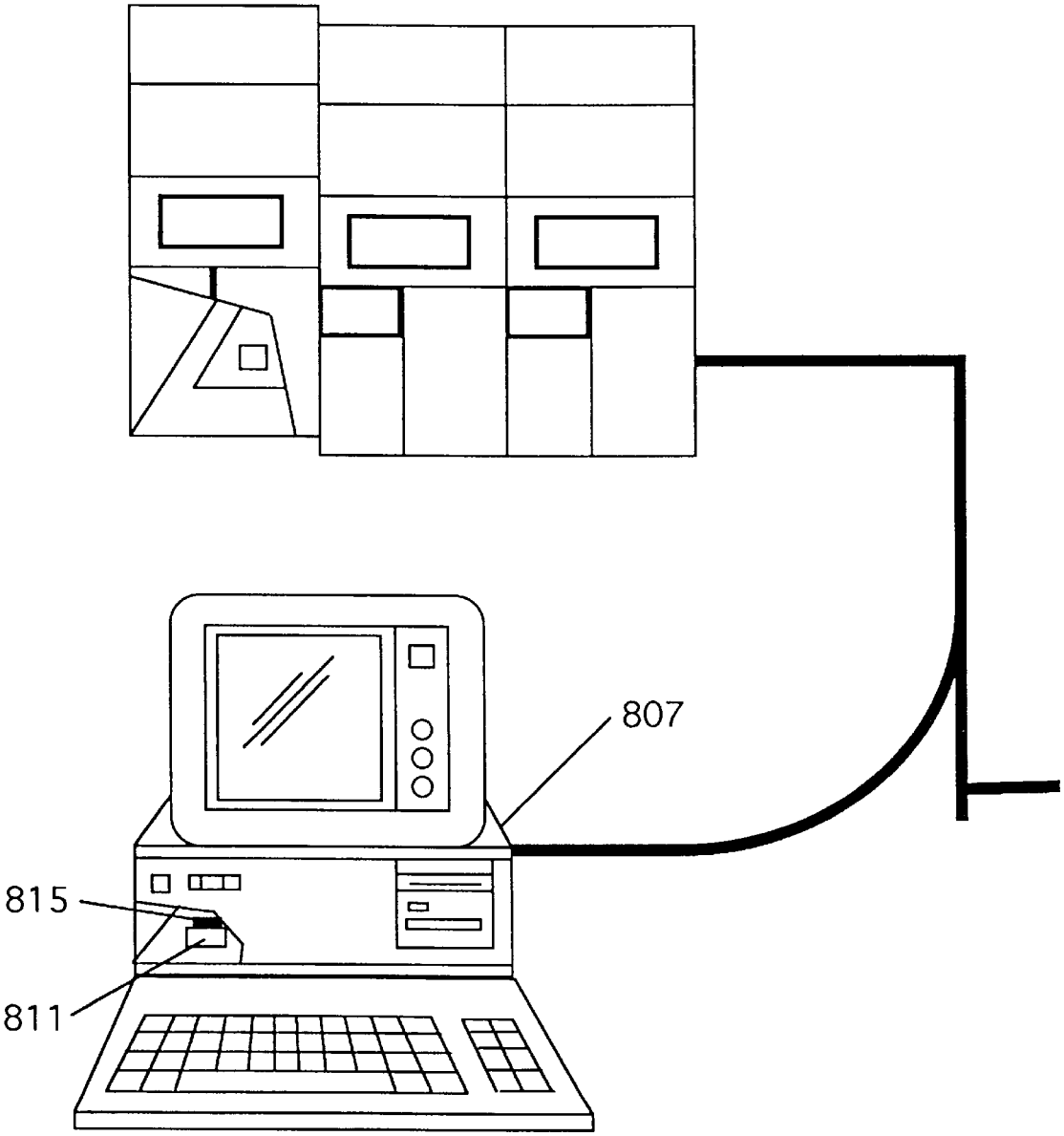
FIG. 8 shows an embodiment of a general purpose computer system for use in implementing the present invention.

The present invention is, therefore, enabled through use of a machine which is a special purpose computer created by combining a general purpose computer with computer program code directed to the particular function of accrued use-tax determination (alternatively termed, e.g., accrued use-tax determination software, accrued use-tax determination computer program, accrued use-tax software, accrued use-tax determination program, and/or accrued use-tax determination computer-implemented logic) so that, when connected to an electrical power source, powered by electricity, and activated to execute the computer program code (software), the special purpose computer executes the particular function of accrued use-tax determination pursuant to the instructions from the computer program code. In a commonly deployed embodiment, the general purpose computer has electrically activated components denoted as a central processing unit (CPU), at least one physical memory connected to the CPU, an input keyboard connected to the CPU, an output display (which can include, without limitation, a printer, printing terminal where output is printed on paper, cathode ray tube monitor, and/or flat panel monitor) connected to the CPU, a computer clock pulse generator within the CPU for providing periodic signals which assist in latching and interconnecting internal circuits in the CPU and in synchronizing operations of the CPU in real-time, and a connection to electrical power for energizing all of the electrically activated components of the computer. The CPU further has control circuits, a bus, and specific computer circuits for either temporarily holding data (e.g., a register or an accumulator), for executing fundamental data processing operations (e.g., an addition circuit and/or a boolean logical operation circuit), or for executing types of instructions (e.g. an arithmetic logical unit or ALU combining arithmetic and logical operations into an essentially unified sub-circuit); the specific computer circuits are connected in communication to the control bus and, in some cases, to each other through latching circuits which can individually be in either a conducting (communicating) or non-conducting (non-communicating) configuration; the collective configurations of all the latching circuits at a particular moment define a particular state of the central processor; and the state of the central processor is respectively modified and changed from the individual instructions of the computer program code as they are successively accessed in the central processing unit in conjunction with the output of the clock pulse generator. The general purpose computer also has computer program code in the form of a commercially available operating system which functions as a computer program code platform for enabling the execution of the special purpose computer program code directed to the particular function of accrued use-tax determination. In overview, the present invention is implemented by and through partial use of a computer which has been programmed to perform the accrued use-tax determination; the general purpose computer functions as a medium for realizing the functionality provided by the computer program code's functionality. The preferred embodiment is deployed on an IBM 9021-9X2 or an IBM 9021-982 mainframe computer using the MVS operating system available from IBM, Old Orchard Road, Armonk, N.Y., 10504, and the SAP-R2 application system platform available from SAP America, Inc., 625 North Governor Printz Blvd., Essington, Pa. 19029. In some embodiments, some communication linkages within an extended form of the special purpose computer may be implemented by electrical, optical, or radio-frequency signal communication interfaces and communication media which collectively use electrically-powered transmitter and receiver components which are directly or indirectly linked to at least one central processing unit. As should be apparent, in some embodiments of the present invention, a set of networked or otherwise linked general purpose computers collectively function to execute the computer program code. FIG. 8 shows an embodiment of a general purpose computer 801 for use in implementing the present invention with a mainframe computer 803 being linked via a network 805 to a desktop workstation 807. The mainframe computer 803 and desktop workstation 807 each have a respective CPU 809 and CPU 811. The mainframe computer 803 and desktop workstation 807 each also have respective logic 813 and logic 815 interactive with the respective CPUs 809 & 811. The logic 813 includes the operating system for the mainframe computer 803 and the accrued use-tax determination computer-implemented logic of the present invention discussed with respect to FIGS. 1 through 7. The logic 815 of the desktop workstation includes the operating system for the desktop computer 803 and a terminal emulator which functions with the monitor 817 for enabling human interface to the logic 813 of the mainframe computer 803. The preferred embodiment of the desktop workstation is deployed on an IBM 330-P75 Personal Computer having a Windows 95 operating system available from Microsoft Corporation, 1-T Microsoft Way, Redmond, Wash., 98052, and an "IRMA for the Mainframe" 3.0.0 terminal emulator available from Digital Communications Associates, Inc., 1000 Alderman Drive, Alpharetta, Ga. 30202-4199.

The present invention has been described in an illustrative manner. In this regard, it is evident that those skilled in the art, once given the benefit of the foregoing disclosure, may now make modifications to the specific embodiments described herein without departing from the spirit of the present invention. Such modifications are to be considered within the scope of the present invention which is limited solely by the scope and spirit of the appended claims.

We claim:

1. An apparatus for determining accrued use-taxes, comprising:

a computer;

transaction record acquisition logic in said computer for acquiring transaction information characterizing purchases of goods and services, and for generating transaction records;

use-tax accrual logic in said computer linked to said transaction records; said accrual logic having an enumerated liability account for holding a listed set of said records, and said logic further having an accrual liability account for holding a single valoue representing the cumulative impact of said listed set on said use-taxes; and tax rate acquisition logic in said computer for acquiring tax jurisdiction codes, at least one inclusive accounting group registry respective to taxes, and tax information respective to said tax jurisdiction codes for a plurality of state jurisdictions, and for generating a data schema linked to said use-tax accrual logic having first data elements descriptive of inclusive accounting group registries, second data elements descriptive of tax jurisdiction codes, and third data elements descriptive of tax data respective to said tax jurisdiction codes, said third data elements having a data type for holding a multiple set of taxable percentages for a cost object so that a plurality of use-tax values may be generated from said listed set with each value having its respective taxable percentage basis retained in said data schema.

2. The apparatus of claim 1 wherein said tax rate acquisition logic further comprises logic for acquiring excluded accounting group registries and said data schema further comprises fourth data elements descriptive of said excluded accounting group registries.

3. The apparatus of claim 2 wherein said first, second, third, and fourth data elements are arranged in tables of said data schema.

4. The apparatus of claim 1 further comprising data alignment logic in said computer which is used to determine if any of said first, second, and third data elements are both included for use and also excluded from use in said use-tax accrual logic for a particular use-tax determination instance.

5. The apparatus of claim 2 further comprising data alignment logic in said computer which is used to determine if any of said first, second, third, and fourth data elements are both included for use and also excluded from use in said use-tax accrual logic for a particular use-tax determination instance.

6. The apparatus of claim 1 further comprising transaction record extraction logic in said computer used to read said transaction records, parse and selectively extract data necessary for defining said accrued use-taxes, and write the extracted data into a transaction data file, wherein said use-tax accrual logic is linked to said transaction data file and to said enumerated liability account so that said listed set can be constructed from said transaction data file.

7. An apparatus for determining accrued use-taxes, said apparatus having a network linkage communicating to a periodically modified tax rate database, comprising:

a computer;

transaction record acquisition logic in said computer for acquiring transaction information characterizing purchases of goods and services, and for generating transaction records;

use-tax accrual logic in said computer linked to said transaction records, said accrual logic having an enumerated liability account for holding a listed set of said records, and said logic further having an accrual liability account for holding a single value representing the cumulative impact of said listed set on said use-taxes;

tax rate acquisition logic in said computer for acquiring tax jurisdiction codes, at least one inclusive accounting group registry respective to taxes, and tax information respective to said tax jurisdiction codes for a plurality of state jurisdictions, and for generating a data schema linked to said use-tax accrual logic having first data elements descriptive of inclusive accounting group registries, second data elements descriptive of tax jurisdiction codes, and third data elements descriptive of tax data respective to said tax jurisdiction codes, said third data elements having a data type for holding a multiple set of taxable percentages for a cost object so that a plurality of use-tax values may be generated from said listed set with each value having its respective taxable percentage basis retained in said data schema; and tax rate update logic in said computer linked to said data schema and to said tax rate database for periodically acquiring new tax information from said tax rate database to replace respective third data elements.

8. The apparatus of claim 7 wherein said tax rate acquisition logic further comprises logic for acquiring data elements excluded accounting group registries, and said data schema further comprises fourth data elements descriptive of said excluded accounting group registries.

9. The apparatus of claim 8 wherein said first, second, third, and fourth data elements are arranged in tables of said data schema.

10. The apparatus of claim 7 further comprising data alignment logic in said computer which is used to determine if any of said first, second, and third data elements are both included for use and also excluded from use in said use-tax accrual logic for a particular use-tax determination instance.

11. The apparatus of claim 8 further comprising data alignment logic in said computer which is used to determine if any of said first, second, third, and fourth data elements are both included for use and also excluded from use in said use-tax accrual logic for a particular use-tax determination instance.

12. The apparatus of claim 7 further comprising transaction record extraction logic used to read said transaction records, parse and selectively extract data necessary for defining said accrued use-taxes, and write the extracted data into a transaction data file, wherein said use-tax accrual logic is linked to said transaction data file and to said enumerated liability account so that said listed set can be constructed from said transaction data file.

13. An apparatus for determining accrued use-taxes, said apparatus having a linkage to a sales tax payment record which contains a list of paid sales taxes, comprising:

a computer;

transaction record acquisition logic in said computer for acquiring transaction information characterizing purchases of goods and services, and for generating transaction records;

use-tax accrual logic in said computer linked to said transaction records, said accrual logic having an enumerated liability account for holding a listed set of said records, and said logic further having an accrual liability account for holding a single value representing the cumulative impact of said listed set on said use-taxes;

tax rate acquisition logic in said computer for acquiring tax jurisidction codes, at least one inclusive accounting group registry respective to taxes, and tax information respective to said tax jurisdiction codes for a plurality of state jurisdictions, and for generating a data schema linked to said use-tax accrual logic having first data elements descriptive of inclusive accounting group registries, second data elements descriptive of tax jurisdiction codes, and third data elements descriptive of tax data respective to said tax jurisdiction codes, said third data elements having a data type for holding a multiple set of taxable percentages for a cost object so that a plurality of use-tax values may be generated from said listed set with each value having its respective taxable percentage basis retained in said data schema; and sales tax crediting logic in said computer linked to said sales tax payment record and to said data schema such that said paid sales taxes can be debited to said accrued use-taxes.

14. The apparatus of claim 13 wherein said tax rate acquisition logic further comprises logic for acquiring data elements descriptive of excluded accounting group registries, and said data schema further comprises fourth data elements descriptive of said excluded accounting group registries.

15. The apparatus of claim 14 wherein said first, second, third, and fourth data elements are arranged in tables of said data schema.

16. The apparatus of claim 13 further comprising data alignment logic in said computer which is used to determine if any of said first, second, and third data elements are both included for use and also excluded from use in said use-tax accrual logic for a particular use-tax determination instance.

17. The apparatus of claim 14 further comprising data alignment logic in said computer which is used to determine if any said first, second, third, and fourth data elements are both included for use and also excluded from use in said use-tax accrual logic for a particular use-tax determination instance.

18. The apparatus of claim 13 further comprising transaction record extraction logic in said computer used to read said transaction records, parse and selectively extract data necessary for defining said accrued use-taxes, and write the extracted data into a transaction data file, wherein said use-tax accrual logic is linked to said transaction data file and to said enumerated liability account so that said listed set can be constructed from said transaction data file.

19. A method for determining accrued use-taxes from transaction records holding data elements which characterize purchases of goods and services, comprising the steps of:

providing a computer;

acquiring transaction information charactarizing purchases of goods and services;

generating transaction records in said computer from said transaction information;

accessing, in said computer, said transaction records to define a listed set of said records which characterize purchases of goods and services;

storing said listed set;

acquiring tax jurisdiction codes, at least one inclusive accounting group registry respective to taxes, and tax information respective to said tax jurisdiction codes for a plurality of state jurisdictions;

generating in said computer a data schema having first data elements descriptive of inclusive accounting group registries, second data elements descriptive of tax jurisdiction codes, and third data elements descriptive of tax data respective to said tax jurisdiction codes, said third data elements having a data type for holding a multiple set of taxable percentages for a cost object so that a plurality of use-tax values may be generated from said listed set with each value having its respective taxable percentage basis retained in said data schema;

accessing in said computer said data schema to acquire said first, second, and third data elements;

using said listed set and using said first, second, and third data elements to determine said accrued use-taxes in said computer; and deriving a single value representing the cumulative impact of said listed set on said use-taxes.

20. The method of claim 19 further comprising acquiring data elements descriptive of excluded accounting group registries, and generating in said data schema in said computer fourth data elements descriptive of said excluded accounting group registries.

21. The method of claim 20 wherein said first, second, third, and fourth data elements are arranged in said computer in tables of said provided data schema.

22. The method of claim 19 further comprising the step of determining if any of said first, second, and third data elements are both included for use and also excluded from use in a particular use-tax determination instance.

23. The method of claim 20 further comprising the step of determining if any of said first, second, third, and fourth data elements are both included for use and also excluded from use in a particular use-tax determination instance.

24. The method of claim 19 wherein said accessing further comprises the steps of parsing and selectively extracting data necessary for defining said accrued use-taxes from said transaction records, writing the extracted data into a transaction data file, and determining said listed set from said transaction data file.

25. A method for determining accrued use-taxes from transaction records holding data elements which characterize purchases of goods and services and from a periodically modified tax rate database, comprising the steps of:

providing a computer;

acquiring transaction information characterizing purchases of goods and services;

generating transaction records in said computer from said transaction information;

accessing, in said computer, said transaction records to define a listed set of said records which characterize purchases of goods and services;

storing said listed set;

acquiring tax jurisdiction codes, at least one inclusive accounting group registry respective to taxes, and tax information respective to said tax jurisdiction codes for a plurality of state jurisdictions;

generating in said computer a data schema having first data elements descriptive of inclusive accounting group registries, second data elements descriptive of tax jurisdiction codes, and third data elements descriptive of tax data respective to said tax jurisdiction codes, said third data elements having a data type for holding a multiple set of taxable percentages for a cost object so that a plurality of use-tax values may be generated from said listed set with each value having its respective taxable percentage basis retained in said data schema;

accessing in said computer said data schema to acquire said first, second, and third data elements;

using said listed set and using said first, second, and third data elements to determine said accrued use-taxes in said computer;

driving a single value representing the cumulative impact of said listed set on said use-taxes; and periodically acquiring new tax information from said tax rate database to replace respective third data elements.

26. The method of claim 25 further comprising acquiring into said computer data elements descriptive of excluded accounting group registries, and generating in said data schema in said computer fourth data elements descriptive of said excluded accounting group registries.

27. The method of claim 26 wherein said first, second, third, and fourth data elements are arranged in said computer in tables of said provided data schema.

28. The method of claim 25 further comprising the step of determining if any of said first, second, and third data elements are both included for use and also excluded from use in a particular use-tax determination instance.

29. The method of claim 26 further comprising the step of determining if any of said first, second, third, and fourth data elements are both included for use and also excluded from use in a particular use-tax determination instance.

30. The method of claim 25 wherein said accesing further comprises the steps of parsing and selectively extracting data necessary for defining said accrued use-taxes from said transaction records, writing the extracted data into a transaction data file, and determining said listed set from said transaction data file.

31. A method for determining accrued use-taxes from transaction records holding data elements which characterize purchases of goods and services and from a sales tax payment record which contains a list of paid sales taxes, comprising the steps of:

providing a computer;

acquiring transaction information characterizing purchases of goods and services;

generating transaction records in said computer from said transaction information;

accessing, in said computer, said transaction records to define a listed set of said records which characterize purchases of goods and services;

storing said listed set;

acquiring tax jurisdiction codes, at least one inclusive accounting group registry respective to taxes, and tax information respective to said tax jurisdiction codes for a plurality of state jurisdictions;

generating in said computer a data schema having first data elements descriptive of inclusive accounting group registries, second data elements descriptive of tax jurisdiction codes, and third data elements descriptive of tax data respective to said tax jurisdiction codes, said third data elements having a data type for holding a multiple set of taxable percentages for a cost object so that a plurality of use-tax values may be generated from said listed set with each value having its respective taxable percentage basis retained in said data schema;

accessing in said computer said data schema to acquire said first, second, and third data elements;

using said listed set and using said first, second, and third data elements to determine said accrued use-taxes in said computer;

deriving a single value representing the cumulative impact of said listed set on said use-taxes; and debiting said paid sales taxes to said accrued use-taxes.

32. The method of claim 31 further comprising acquiring into said computer data elements descriptive of excluded accounting group registries, and generating in said data schema in said computer fourth data elements descriptive of said excluded accounting group registries.

33. The method of claim 32 wherein said first, second, third, and fourth data elements are arranged in said computer in tables of said provided data schema.

34. The method of claim 31 further comprising the step of determining if any of said first, second, and third data elements are both included for use and also excluded from use in a particular use-tax determination instance.

35. The method of claim 32 further comprising the step of determining if any of said first, second, third, and fourth data elements are both included for use and also excluded from use in a particular use-tax determination instance.

36. The method of claim 31 wherein said accessing further comprises the steps of parsing and selectively extracting data necessary for defining said accrued use-taxes from said transaction records, writing the extracted data into a transaction data file, and determining said listed set from said transaction data file.

* * * * *